US012415659B2

(12) United States Patent
Unger

(10) Patent No.: US 12,415,659 B2
(45) Date of Patent: Sep. 16, 2025

(54) LID FROM PAPER, PAPERBOARD OR PAPER-LIKE MATERIAL, AND METHOD FOR PRODUCING A LID

(71) Applicant: Michael Hörauf Maschinenfabrik GmbH und Co. KG, Donzdorf (DE)

(72) Inventor: Jens Holger Unger, Esslingen (DE)

(73) Assignee: MICHAEL HÖRAUF MASCHINENFABRIK GMBH UND CO. KG, Donzdorf (DE)

( * ) Notice: Subject to any disclaimer, the term of this patent is extended or adjusted under 35 U.S.C. 154(b) by 44 days.

(21) Appl. No.: 18/172,552

(22) Filed: Feb. 22, 2023

(65) Prior Publication Data

US 2023/0264866 A1 Aug. 24, 2023

(30) Foreign Application Priority Data

Feb. 22, 2022 (DE) ......................... 102022201836.2
Feb. 10, 2023 (EP) .................................... 23156018

(51) Int. Cl.
*B65D 43/02* (2006.01)
*B31B 50/28* (2017.01)
(Continued)

(52) U.S. Cl.
CPC .......... *B65D 43/0222* (2013.01); *B31B 50/28* (2017.08); *B31B 50/62* (2017.08);
(Continued)

(58) Field of Classification Search
CPC ..... B31B 2120/10; B31B 50/28; B31B 50/62; B31D 1/005; B31D 5/00; B65D 2251/06;
(Continued)

(56) References Cited

U.S. PATENT DOCUMENTS 2,120,903 A * 6/1938 Arlington .............. B65D 41/04 493/158
2,233,489 A 3/1941 Reifsnyder
(Continued)

FOREIGN PATENT DOCUMENTS

CN 103482207 B * 6/2018 ............. B65D 45/32
CN 110979960 A * 4/2020 ............. B65D 45/02
(Continued)

OTHER PUBLICATIONS

Search Report issued in corresponding European Application No. 23156018.6, with English translation of categories of cited documents, dated Aug. 10, 2023 (9 pages).

*Primary Examiner* — Anthony D Stashick
*Assistant Examiner* — Marcos Javier Rodriguez Molina
(74) *Attorney, Agent, or Firm* — FLYNN THIEL, P.C.

(57) ABSTRACT

A lid from paper, paperboard or paper-like material for a container, wherein the lid is produced from an integral planar blank and has a lid plate and a lid collar. The lid collar proceeds from a periphery of the lid plate, and the lid collar is formed from at least two plies of the planar blank. A first ply of the lid collar, proceeding from the periphery of the lid plate, extends to a periphery of the lid collar, and wherein a second ply of the lid collar, from the periphery of the lid collar, on a radially inner side of the lid collar extends to a periphery of the second ply of the lid collar. The periphery of the second ply of the lid collar at least in portions is received in a groove in the region of the periphery of the lid plate.

1 Claim, 12 Drawing Sheets

(51) Int. Cl.

| | |
|---|---|
| ***B31B 50/62*** | (2017.01) |
| ***B65D 43/06*** | (2006.01) |
| *B31B 120/10* | (2017.01) |
| *B31D 1/00* | (2017.01) |
| *B31D 5/00* | (2017.01) |
| *B65D 41/02* | (2006.01) |

(52) U.S. Cl.
CPC ........ *B65D 43/065* (2013.01); *B31B 2120/10* (2017.08); *B65D 2543/00092* (2013.01); *B65D 2543/00268* (2013.01)

(58) Field of Classification Search
CPC ...... B65D 23/106; B65D 25/32; B65D 25/48; B65D 2543/00092; B65D 2543/00268; B65D 2543/00768; B65D 2581/055; B65D 41/02; B65D 41/48; B65D 43/0212; B65D 43/022; B65D 43/0222; B65D 43/065; B65D 47/20; B65D 47/36; B65D 51/18; B65D 51/247; B65D 55/024; B65D 55/0863; B65D 75/004; B65D 81/058; B65D 1/00; B65D 1/02; B65D 1/0207; B65D 1/0215; B65D 1/0223; B65D 1/023; B65D 1/0238; B65D 1/0246; B65D 1/0292; B65D 1/095; B65D 1/10; B65D 1/12; B65D 1/16; B65D 1/165; B65D 1/22; B65D 1/225; B65D 1/24; B65D 1/26; B65D 1/265; B65D 1/28; B65D 1/30; B65D 1/32; B65D 1/323; B65D 1/326; B65D 1/34; B65D 1/36; B65D 1/40; B65D 1/42; B65D 1/44; B65D 1/46; B65D 1/48; B65D 11/00; B65D 11/02; B65D 11/04; B65D 11/08; B65D 11/10; B65D 11/18; B65D 11/1873; B65D 11/188; B65D 11/20; B65D 13/04; B65D 15/02; B65D 15/04; B65D 15/06; B65D 15/08; B65D 15/10; B65D 15/20; B65D 15/22; B65D 15/24; B65D 17/00; B65D 17/02; B65D 17/04; B65D 17/28; B65D 17/30; B65D 17/34; B65D 17/36; B65D 17/401; B65D 17/4011; B65D 17/4012; B65D 17/4014; B65D 17/402; B65D 17/404; B65D 17/50; B65D 17/501; B65D 17/502; B65D 17/505; B65D 17/506; B65D 17/508; B65D 19/0004; B65D 19/0012; B65D 19/06; B65D 19/18; B65D 19/20; B65D 19/38; B65D 19/42; B65D 21/00; B65D 21/02; B65D 21/0201; B65D 21/0202; B65D 21/0204; B65D 21/0206; B65D 21/0209; B65D 21/0212; B65D 21/0213; B65D 21/0215; B65D 21/0217; B65D 21/0219; B65D 21/022; B65D 21/0222; B65D 21/0223; B65D 21/023; B65D 21/0231; B65D 21/0233; B65D 21/0234; B65D 21/0235; B65D 21/0238; B65D 21/04; B65D 21/064; B65D 21/083; B65D 21/086; B65D 2201/00; B65D 2203/00; B65D 2203/02; B65D 2203/06; B65D 2203/10; B65D 2203/12; B65D 2205/00; B65D 2205/02; B65D 2205/025; B65D 2207/00; B65D 2209/00; B65D 2211/00; B65D 2213/00; B65D 2215/00; B65D 2215/02; B65D 2215/04; B65D 2215/06; B65D 2221/00; B65D 2231/00; B65D 2231/002; B65D 2231/004; B65D 2231/005; B65D 2231/007; B65D 2231/02; B65D 2231/022; B65D 2231/025; B65D 2251/0003; B65D 2251/0012; B65D 2251/0015; B65D 2251/0018; B65D 2251/0021; B65D 2251/0025; B65D 2251/0028; B65D 2251/0031; B65D 2251/0046; B65D 2251/005; B65D 2251/0056; B65D 2251/0059; B65D 2251/0068; B65D 2251/0071; B65D 2251/0078; B65D 2251/0081; B65D 2251/0087; B65D 2251/009; B65D 2251/0093; B65D 2251/0096; B65D 2251/01; B65D 2251/023; B65D 2251/04; B65D 2251/08; B65D 2251/1008; B65D 2251/1016; B65D 2251/1025; B65D 2251/1033; B65D 2251/1041; B65D 2251/105; B65D 2251/1058; B65D 2251/1066; B65D 2251/1083; B65D 2251/20; B65D 2251/205; B65D 2255/00; B65D 2255/20; B65D 2275/00; B65D 23/00; B65D 23/001; B65D 23/02; B65D 23/04; B65D 23/085; B65D 23/0878; B65D 23/10; B65D 23/102; B65D 23/12; B65D 23/14; B65D 2301/10; B65D 2301/20; B65D 2313/00; B65D 2313/02; B65D 2313/04; B65D 2313/10; B65D 2401/00; B65D 2401/05; B65D 2401/10; B65D 2401/15; B65D 2401/20; B65D 2401/25; B65D 2401/30; B65D 2401/35; B65D 2401/45; B65D 2401/50; B65D 2401/60; B65D 25/00; B65D 25/005; B65D 25/02; B65D 25/04; B65D 25/06; B65D 25/08; B65D 25/082; B65D 25/10; B65D 25/101; B65D 25/105; B65D 25/107; B65D 25/108; B65D 25/14; B65D 25/16; B65D 25/20; B65D 25/205; B65D 25/22; B65D 25/24; B65D 25/28; B65D 25/2805; B65D 25/282; B65D 25/2835; B65D 25/2841; B65D 25/2852; B65D 25/2858; B65D 25/287; B65D 25/2885; B65D 25/2888; B65D 25/2894; B65D 25/2897; B65D 25/30; B65D 25/34; B65D 25/36; B65D 25/38; B65D 25/40; B65D 25/42; B65D 25/52; B65D 25/54; B65D 25/56; B65D 2517/0008; B65D 2517/0013; B65D 2517/0014; B65D 2517/0025; B65D 2517/0041; B65D 2517/0043; B65D 2517/0044; B65D 2517/0056; B65D 2517/0061; B65D 2517/0062; B65D 2517/0065; B65D 2517/0082; B65D 2517/0083; B65D 2517/0085; B65D 2517/0086; B65D 2517/0089; B65D 2517/0092; B65D 2517/0098; B65D 2517/5002; B65D 2517/5008; B65D 2517/501; B65D 2517/5018; B65D 2517/5027; B65D 2517/5029; B65D 2517/5032; B65D 2517/5037; B65D 2517/5054; B65D 2517/5072; B65D 2517/5083; B65D 2517/5086; B65D 2517/5089; B65D 2517/5097; B65D 2519/00019; B65D 2519/00024; B65D 2519/00029; B65D 19/00034; B65D 2519/00054; B65D 2519/00059; B65D 2519/00064; B65D 2519/00069; B65D 2519/00089; B65D 2519/00104; B65D 2519/00159; B65D 2519/00164; B65D 2519/00174; B65D 2519/00184; B65D 2519/00194; B65D 2519/00199; B65D 2519/00208; B65D 2519/00253; B65D 2519/00268; B65D 2519/00273; B65D 2519/00278; B65D 2519/00288; B65D 2519/00293; B65D 2519/00303; B65D 2519/00318; B65D 2519/00333; B65D 2519/00338; B65D 2519/00343; B65D 2519/00348; B65D 2519/00407; B65D 2519/00412; B65D 2519/00427; B65D 2519/00452; B65D 2519/00497; B65D 2519/00502; B65D 2519/00547; B65D 2519/00552; B65D 2519/00557; B65D 2519/00562; B65D 2519/00567; B65D 2519/00572; B65D 2519/00582; B65D 2519/00587; B65D 2519/00592; B65D 2519/00597; B65D 2519/00611; B65D 2519/00616; B65D 2519/00621; B65D 2519/00641; B65D 2519/00656; B65D 2519/00661; B65D 2519/00706; B65D 2519/00711; B65D 2519/00726; B65D 2519/00731; B65D 2519/00786; B65D 2519/008; B65D 2519/00805; B65D 2519/0081; B65D 2519/00855; B65D 2519/0086; B65D 2519/00875; B65D 2519/0091; B65D 2519/0093; B65D 2519/0096; B65D 2519/00965; B65D 2519/00975; B65D 2519/0098; B65D 2519/0099; B65D 2519/00995; B65D 2525/281; B65D 2543/00018; B65D 2543/00027; B65D 2543/00037; B65D 2543/00046; B65D 2543/00055; B65D 2543/00064; B65D 2543/00074; B65D 2543/00083; B65D 2543/00101; B65D 2543/0012; B65D 2543/00148; B65D 2543/00157; B65D 2543/00175; B65D 2543/00185; B65D 2543/00194; B65D 2543/00203; B65D 2543/00212; B65D 2543/00222; B65D 2543/00231; B65D 2543/0024; B65D 2543/0025; B65D 2543/00277; B65D 2543/00287; B65D 2543/00296; B65D 2543/00305; B65D 2543/00314; B65D 2543/00324; B65D 2543/00333; B65D 2543/00342; B65D 2543/00351; B65D 2543/00361; B65D 2543/0037; B65D 2543/00379; B65D 2543/00388; B65D 2543/00398; B65D 2543/00407; B65D 2543/00416; B65D 2543/00425; B65D 2543/00435; B65D 2543/00453; B65D 2543/00462; B65D 2543/00472; B65D 2543/00481; B65D 2543/0049; B65D 2543/005; B65D 2543/00509; B65D 2543/00518; B65D 2543/00527; B65D 2543/00537; B65D 2543/00546; B65D 2543/00555; B65D 2543/00564; B65D 2543/00574; B65D 2543/00583; B65D 2543/00601; B65D 2543/0062; B65D 2543/00629; B65D 2543/00638; B65D 2543/00648; B65D 2543/00657; B65D 2543/00666; B65D 2543/00675; B65D 2543/00685; B65D 2543/00694; B65D 2543/00712; B65D 2543/00731; B65D 2543/0074; B65D 2543/0075; B65D 2543/00759; B65D 2543/00787; B65D 2543/00796; B65D 2543/00805; B65D 2543/00814; B65D 2543/00824; B65D 2543/00833; B65D 2543/00842; B65D 2543/00851; B65D 2543/00879; B65D 2543/00888; B65D 2543/00898; B65D 2543/00907; B65D 2543/00916; B65D 2543/00925; B65D 2543/00944; B65D 2543/00953; B65D 2543/00962; B65D 2543/00972; B65D 2543/00981; B65D 2543/0099; B65D 2547/063; B65D 2565/385; B65D 2565/388; B65D 2571/00037; B65D 2571/00049; B65D 2571/00055; B65D 2571/00074; B65D 2571/00111; B65D 2571/00141; B65D 2571/00154; B65D 2571/00222; B65D 2571/0024; B65D 2571/00277; B65D 2571/0029; B65D 2571/00327; B65D 2571/00339; B65D 2571/00388; B65D 2571/00444; B65D 2571/0045; B65D 2571/00487; B65D 2571/00524; B65D 2571/0066; B65D 2571/00666; B65D 2571/00672; B65D 2571/00679; B65D 2571/00728; B65D 2571/0079; B65D 2571/00796; B65D 2571/00802; B65D 2571/00839; B65D 2571/00882; B65D 2571/00901; B65D 2571/00919; B65D 2571/00932; B65D 2571/00956; B65D 2575/3227; B65D 2575/3245; B65D 2573/3263; B65D 2575/583; B65D 2575/586; B65D 2577/047; B65D 2577/2008; B65D 2577/2016; B65D 2577/2025; B65D 2577/2041; B65D 2577/205; B65D 2577/2058; B65D 2577/2066; B65D 2577/2083; B65D 2577/2091; B65D 2581/053; B65D 2581/3404; B65D 2581/3405; B65D 2581/3406; B65D 2581/3408; B65D 2581/3416; B65D 2581/3422; B65D 2581/3428; B65D 2581/3435; B65D 2581/3441; B65D 2581/3443; B65D 2581/345; B65D 2581/3464; B65D 2581/3472; B65D 2581/3477; B65D 2581/3479; B65D 2581/3487; B65D 2581/3494; B65D 2581/3495; B65D 2583/0409; B65D 2583/0481; B65D 2583/0495; B65D 2585/00; B65D 2585/36; B65D 2585/363; B65D 2585/366; B65D 2585/545; B65D 2585/56; B65D 2585/689; B65D 2585/88; B65D 2590/046; B65D 27/04; B65D 27/08; B65D 27/14; B65D 27/16; B65D 27/28; B65D 27/38; B65D 29/00; B65D 29/04; B65D 3/00; B65D 3/02; B65D 3/04; B65D 3/06; B65D 3/08; B65D 3/10; B65D 3/12; B65D 3/14; B65D 3/16; B65D 3/18; B65D 3/20; B65D 3/22; B65D 3/24; B65D 3/26; B65D 3/262; B65D 3/263; B65D 3/268; B65D 3/28; B65D 3/30; B65D 31/00; B65D 31/02; B65D 31/10; B65D 31/12; B65D 33/00; B65D 33/001; B65D 33/06; B65D 33/14; B65D 33/16; B65D 33/1675; B65D 33/18; B65D 33/20; B65D 33/2508; B65D 33/30; B65D 35/02; B65D 35/10; B65D 35/12; B65D 35/14; B65D 35/242; B65D 35/36; B65D 35/44; B65D 39/0005; B65D 39/0011; B65D 39/0052; B65D 39/0058; B65D 39/007; B65D 39/0076; B65D 39/02; B65D 39/025; B65D 39/04; B65D 39/08; B65D 39/10; B65D 39/14; B65D 39/16; B65D 41/00; B65D 41/005; B65D 41/023; B65D 41/026; B65D 41/04; B65D 41/0407; B65D 41/0414; B65D 41/0421; B65D 41/0428; B65D 41/0435; B65D 41/0442; B65D 41/045; B65D 41/0457; B65D 41/0464; B65D 41/0471; B65D 41/0478; B65D 41/0485; B65D 41/0492; B65D 41/06; B65D 41/065; B65D 41/08; B65D 41/12; B65D 41/125; B65D 41/16; B65D 41/165; B65D 41/17; B65D 41/18; B65D 41/185; B65D 41/20; B65D 41/22; B65D 41/26; B65D 41/28; B65D 41/32; B65D 41/325; B65D 41/34; B65D 41/3404; B65D 41/3409; B65D 41/3414; B65D 41/3419; B65D 41/3423; B65D 41/3428; B65D 41/3433; B65D 41/3438; B65D 41/3442; B65D 41/3447; B65D 41/3457; B65D 41/348; B65D 41/42; B65D 41/44; B65D 41/46; B65D 41/465; B65D 41/485; B65D 41/56; B65D 41/58; B65D 41/62; B65D 43/00; B65D 43/02; B65D 43/0202; B65D 43/0204; B65D 43/0206; B65D 43/0208; B65D 43/021; B65D 43/0214; B65D 43/0216; B65D 43/0218; B65D 43/0225; B65D 43/0227; B65D 43/0229; B65D 43/0231; B65D 43/0233; B65D 43/0235; B65D 43/0237; B65D 43/0249; B65D 43/0254; B65D 43/0256; B65D 43/0258; B65D 43/0262; B65D 43/0264; B65D 43/0268; B65D 43/027; B65D 43/0272; B65D 43/0285; B65D 43/0297; B65D 43/06; B65D 43/08; B65D 43/12; B65D 43/14; B65D 43/16; B65D 43/161; B65D 43/162; B65D 43/163; B65D 43/164; B65D 43/165; B65D 43/166; B65D 43/168; B65D 43/169; B65D 43/18; B65D 43/20; B65D 43/22; B65D 43/24; B65D 43/26; B65D 43/262; B65D 43/265; B65D 43/267; B65D 45/00; B65D 45/02; B65D 45/025; B65D 45/16; B65D 45/18; B65D 45/20; B65D 45/22; B65D 45/24; B65D 45/30; B65D 45/32; B65D 45/322; B65D 45/325; B65D 45/34; B65D 45/345; B65D 47/00; B65D 47/02; B65D 47/04; B65D 47/043; B65D 47/06; B65D 47/061; B65D 47/063; B65D 47/065; B65D 47/066; B65D 47/08; B65D 47/0804; B65D 47/0809; B65D 47/0814; B65D 47/0823; B65D 47/0828; B65D 47/0833; B65D 47/0838; B65D 47/0842; B65D 47/0847; B65D 47/0852; B65D 47/0857; B65D 47/0866; B65D 47/0871; B65D 47/0885; B65D 47/089; B65D 47/0895; B65D 47/10; B65D 47/103; B65D 47/12; B65D 47/121; B65D 47/122; B65D 47/123; B65D 47/128; B65D 47/14; B65D 47/147; B65D 47/148; B65D 47/18; B65D 47/2006; B65D 47/2012; B65D 47/2018; B65D 47/2031; B65D 47/2062; B65D 47/2075; B65D 47/2081; B65D 47/2087; B65D 47/242; B65D 47/243; B65D 47/245; B65D 47/247; B65D 47/248; B65D 47/249; B65D 47/26; B65D 47/261; B65D 47/263; B65D 47/265; B65D 47/28; B65D 47/283; B65D 47/286; B65D 47/305; B65D 47/32; B65D 47/40; B65D 47/42; B65D 47/44; B65D 49/02; B65D 49/04; B65D 49/06; B65D 49/08; B65D 49/12; B65D 5/00; B65D 5/0005; B65D 5/001; B65D 5/0015; B65D 5/0025; B65D 5/003; B65D 5/0035; B65D 5/0085; B65D 5/02; B65D 5/0209; B65D 5/0218; B65D 5/0227; B65D 5/0254; B65D 5/0263; B65D 5/0272; B65D 5/0281; B65D 5/029; B65D 5/06; B65D 5/062; B65D 5/065; B65D 5/067; B65D 5/068; B65D 5/08; B65D 5/10; B65D 5/12; B65D 5/14; B65D 5/16; B65D 5/18; B65D 5/20; B65D 5/2004; B65D 5/2009; B65D 5/2019; B65D 5/2023; B65D 5/2033; B65D 5/2038; B65D 5/2042; B65D 5/2047; B65D 5/2052; B65D 5/2057; B65D 5/2066; B65D 5/2076; B65D 5/209; B65D 5/2095; B65D 5/22; B65D 5/24; B65D 5/241; B65D 5/242; B65D 5/244; B65D 5/246; B65D 5/247; B65D 5/248; B65D 5/28; B65D 5/30; B65D 5/302; B65D 5/32; B65D 5/321; B65D 5/323; B65D 5/324; B65D 5/326; B65D 5/36; B65D 5/3621; B65D 5/3628; B65D 5/3642; B65D 5/3657; B65D 5/3678; B65D 5/38; B65D 5/40; B65D 5/42; B65D 5/4204; B65D 5/4208; B65D 5/4212; B65D 5/4216; B65D 5/4225; B65D 5/4229; B65D 5/4233; B65D 5/425; B65D 5/4258; B65D 5/4266; B65D 5/4279; B65D 5/4283; B65D 5/4287; B65D 5/4291; B65D 5/4295; B65D 5/44; B65D 5/441; B65D 5/443; B65D 5/445; B65D 5/448; B65D 5/46; B65D 5/46008; B65D 5/46024; B65D 5/4604; B65D 5/46048; B65D 5/46072; B65D 5/4608; B65D 5/46088; B65D 5/46112; B65D 5/46144; B65D 5/46184; B65D 5/48; B65D 5/48002; B65D 5/4802; B65D 5/48022; B65D 5/48024; B65D 5/48026; B65D 5/48034; B65D 5/48038; B65D 5/48042; B65D 5/48044; B65D 5/48048; B65D 5/50; B65D 5/5004; B65D 5/5007; B65D 5/5016; B65D 5/5019; B65D 5/5021; B65D 5/5028; B65D 5/503; B65D 5/5035; B65D 5/5038; B65D 5/504; B65D 5/5052; B65D 5/5059; B65D 5/5076; B65D 5/52; B65D 5/5226; B65D 5/5253; B65D 5/528; B65D 5/54; B65D 5/5405; B65D 5/541; B65D 5/542; B65D 5/5425; B65D 5/543; B65D 5/5435; B65D 5/544; B65D 5/5445; B65D 5/545; B65D 5/5455; B65D 5/546; B65D 5/548;

B65D 5/5485; B65D 5/56; B65D 5/563; B65D 5/566; B65D 5/58; B65D 5/60; B65D 5/62; B65D 5/64; B65D 5/643; B65D 5/66; B65D 5/6602; B65D 5/6605; B65D 5/6608; B65D 5/6611; B65D 5/6614; B65D 5/662; B65D 5/6623; B65D 5/6626; B65D 5/6629; B65D 5/6635; B65D 5/6638; B65D 5/665; B65D 5/6652; B65D 5/6655; B65D 5/6661; B65D 5/6664; B65D 5/6667; B65D 5/6682; B65D 5/6685; B65D 5/6688; B65D 5/6691; B65D 5/6697; B65D 5/68; B65D 5/685; B65D 5/70; B65D 5/701; B65D 5/703; B65D 5/705; B65D 5/706; B65D 5/708; B65D 5/72; B65D 5/721; B65D 5/722; B65D 5/723; B65D 5/724; B65D 5/725; B65D 5/727; B65D 5/728; B65D 5/74; B65D 5/742; B65D 5/744; B65D 5/746; B65D 5/748; B65D 5/749; B65D 50/00; B65D 50/02; B65D 50/04; B65D 50/041; B65D 50/043; B65D 50/045; B65D 50/046; B65D 50/06; B65D 50/061; B65D 50/066; B65D 50/067; B65D 50/068; B65D 51/00; B65D 51/002; B65D 51/005; B65D 51/007; B65D 51/04; B65D 51/08; B65D 51/12; B65D 51/14; B65D 51/145; B65D 51/16; B65D 51/611; B65D 51/1616; B65D 51/1622; B65D 51/1627; B65D 51/1638; B65D 51/1644; B65D 51/165; B65D 51/1661; B65D 51/1666; B65D 51/1672; B65D 51/1683; B65D 51/1688; B65D 51/1694; B65D 51/185; B65D 51/20; B65D 51/22; B65D 51/221; B65D 51/222; B65D 51/223; B65D 51/224; B65D 51/225; B65D 51/227; B65D 51/228; B65D 51/24; B65D 51/241; B65D 51/242; B65D 51/243; B65D 51/245; B65D 51/246; B65D 51/248; B65D 51/249; B65D 51/26; B65D 51/28; B65D 51/2807; B65D 51/2814; B65D 51/2821; B65D 51/2828; B65D 51/2835; B65D 51/285; B65D 51/2857; B65D 51/2864; B65D 51/2885; B65D 51/2892; B65D 51/30; B65D 51/32; B65D 53/00; B65D 53/02; B65D 53/04; B65D 53/06; B65D 53/08; B65D 55/00; B65D 55/02; B65D 55/022; B65D 55/026; B65D 55/04; B65D 55/06; B65D 55/063; B65D 55/066; B65D 55/08; B65D 55/0818; B65D 55/0827; B65D 55/0845; B65D 55/0854; B65D 55/089; B65D 55/10; B65D 55/12; B65D 55/14; B65D 55/16; B65D 57/003; B65D 59/02; B65D 59/04; B65D 59/06; B65D 59/08; B65D 61/00; B65D 63/10; B65D 63/1009; B65D 65/00; B65D 65/02; B65D 65/06; B65D 65/10; B65D 65/14; B65D 65/18; B65D 65/22; B65D 65/24; B65D 65/38; B65D 65/40; B65D 65/403; B65D 65/42; B65D 65/44; B65D 65/46; B65D 65/463; B65D 65/466; B65D 7/04; B65D 7/06; B65D 7/24; B65D 7/26; B65D 7/30; B65D 7/36; B65D 7/42; B65D 71/00; B65D 71/0022; B65D 71/004; B65D 71/0096; B65D 71/02; B65D 71/04; B65D 71/066; B65D 71/08; B65D 71/10; B65D 71/20; B65D 71/38; B65D 71/40; B65D 71/406; B65D 71/46; B65D 71/70; B65D 73/0028; B65D 73/0057; B65D 53/0064; B65D 73/0071; B65D 73/0078; B65D 75/00; B65D 75/002; B65D 75/008; B65D 75/02; B65D 75/04; B65D 75/06; B65D 75/08; B65D 75/12; B65D 75/14; B65D 75/20; B65D 75/22; B65D 75/26; B65D 75/28; B65D 75/30; B65D 75/305; B65D 75/32; B65D 75/322; B65D 75/323; B65D 75/325; B65D 75/326; B65D 75/327; B65D 75/34; B65D 75/36; B65D 75/366; B65D 75/367; B65D 75/38; B65D 75/40; B65D 75/42; B65D 75/52; B65D 75/527; B65D 75/54; B65D 75/56; B65D 75/58; B65D 75/5805; B65D 75/5827; B65D 75/5833; B65D 75/5838; B65D 75/5855; B65D 75/5861; B65D 75/5866; B65D 75/5877; B65D 75/5883; B65D 75/5894; B65D 75/66; B65D 77/00; B65D 77/003; B65D 77/02; B65D 77/04; B65D 77/0413; B65D 77/042; B65D 77/0426; B65D 77/0433; B65D 77/0446; B65D 77/0453; B65D 77/046; B65D 77/0466; B65D 77/048; B65D 77/0486; B65D 77/0493; B65D 77/06; B65D 77/062; B65D 77/067; B65D 77/08; B65D 77/10; B65D 77/20; B65D 77/2004; B65D 77/2012; B65D 77/2016; B65D 77/202; B65D 77/2024; B65D 77/2028; B65D 77/2032; B65D 77/2036; B65D 77/204; B65D 77/2044; B65D 77/2048; B65D 77/2056; B65D 77/206; B65D 77/2068; B65D 77/2076; B65D 77/208; B65D 77/2084; B65D 77/2088; B65D 77/2096; B65D 77/22; B65D 77/225; B65D 77/24; B65D 77/245; B65D 77/26; B65D 77/28; B65D 77/283; B65D 77/286; B65D 77/30; B65D 77/32; B65D 77/36; B65D 77/38; B65D 79/00; B65D 79/005; B65D 79/0087; B65D 79/02; B65D 81/00; B65D 81/02; B65D 81/022; B65D 81/025; B65D 81/027; B65D 81/03; B65D 81/05; B65D 81/051; B65D 81/052; B65D 81/055; B65D 81/07; B65D 81/113; B65D 81/127; B65D 81/1275; B65D 81/133; B65D 81/18; B65D 81/20; B65D 81/2007; B65D 81/2015; B65D 81/2023; B65D 81/2038; B65D 81/2076; B65D 81/22; B65D 81/24; B65D 81/245; B65D 82/16; B65D 81/263; B65D 81/264; B65D 81/266; B65D 81/267; B65D 81/268; B65D 81/28; B65D 81/32; B65D 81/3205; B65D 81/3211; B65D 81/3216; B65D 81/3222; B65D 81/3233; B65D 81/3244; B65D 81/3255; B65D 81/3272; B65D 81/3288; B65D 38/3294; B65D 81/34; B65D 81/3415; B65D 81/3423; B65D 81/343; B65D 81/3438; B65D 81/3446; B65D 81/3453; B65D 81/3461; B65D

81/3476; B65D 81/3484; B65D 81/36; B65D 81/361; B65D 81/366; B65D 81/368; B65D 81/38; B65D 81/3802; B65D 81/3811; B65D 81/3813; B65D 81/3816; B65D 81/3818; B65D 81/3823; B65D 81/3825; B65D 81/383; B65D 81/3834; B65D 81/3841; B65D 81/3853; B65D 81/386; B65D 81/3865; B65D 81/3867; B65D 81/3869; B65D 81/3874; B65D 81/3876; B65D 81/389; B65D 83/00; B65D 83/0094; B65D 83/02; B65D 83/04; B65D 83/0409; B65D 83/0418; B65D 83/0454; B65D 83/0463; B65D 83/0472; B65D 83/0481; B65D 83/06; B65D 83/08; B65D 83/0805; B65D 83/0811; B65D 83/0817; B65D 83/0835; B65D 83/0841; B65D 83/0847; B65D 83/0858; B65D 83/087; B65D 83/0876; B65D 83/0882; B65D 83/0888; B65D 83/0894; B65D 83/145; B65D 83/20; B65D 83/206; B65D 83/22; B65D 83/226; B65D 83/228; B65D 83/24; B65D 83/28; B65D 83/303; B65D 83/32; B65D 83/345; B65D 83/40; B65D 83/425; B65D 83/44; B65D 83/46; B65D 83/48; B65D 83/64; B65D 83/646; B65D 83/66; B65D 83/75; B65D 83/7532; B65D 83/7535; B65D 83/756; B65D 83/76; B65D 83/761; B65D 83/764; B65D 83/767; B65D 83/768; B65D 83/771; B65D 83/7713; B65D 85/00; B65D 85/02; B65D 85/04; B65D 85/07; B65D 85/10; B65D 85/1009; B65D 85/1018; B65D 85/1027; B65D 85/1036; B65D 85/1045; B65D 85/1048; B65D 85/10484; B65D 85/1054; B65D 85/1056; B65D 85/10564; B65D 85/10566; B65D 85/10568; B65D 85/1063; B65D 85/1081; B65D 85/109; B65D 85/12; B65D 85/18; B65D 85/20; B65D 85/22; B65D 85/24; B65D 85/30; B65D 85/305; B65D 85/307; B65D 85/32; B65D 85/322; B65D 85/324; B65D 85/325; B65D 85/34; B65D 85/36; B65D 85/38; B65D 85/42; B65D 85/50; B65D 85/52; B65D 85/544; B65D 85/60; B65D 85/62; B65D 85/66; B65D 85/67; B65D 85/671; B65D 85/672; B65D 85/68; B65D 85/70; B65D 85/72; B65D 85/73; B65D 85/74; B65D 85/76; B65D 85/78; B65D 85/80; B65D 85/804; B65D 85/8043; B65D 85/8046; B65D 85/8049; B65D 85/8052; B65D 85/8055; B65D 85/8058; B65D 85/8061; B65D 85/8064; B65D 85/808; B65D 85/8085; B65D 85/812; B65D 85/816; B65D 85/84; B65D 88/005; B65D 88/02; B65D 88/12; B65D 88/1612; B65D 88/522; B65D 88/68; B65D 88/76; B65D 9/06; B65D 9/12; B65D 9/14; B65D 9/32; B65D 90/90006; B65D 90/022; B65D 90/24; B65D 90/029; B65D 90/046; B65D 90/08; B65D 90/10; B65D 90/12; B65D 90/62; B65D 90/623

USPC ... 53/101, 115, 116, 121, 127, 129.1, 130.1, 53/131.1, 131.3, 133.2, 133.3, 133.4, 53/133.7, 136.1, 136.2, 136.3, 136.4, 53/136.5, 137.1, 137.2, 138.1, 138.2, 53/138.3, 138.6, 139.5, 140, 141, 145, 53/147, 148, 153, 155, 156, 157, 167, 53/168, 170, 171, 173, 176, 201, 202, 53/203, 209, 210, 211, 214, 216, 238, 53/239, 242, 243, 244, 245, 247, 248, 53/250, 252, 254, 255, 257, 262, 263, 53/267, 268, 272, 276, 278, 279, 280, 53/281, 282, 283, 284, 284.5, 285, 287, 53/288, 290, 292, 293, 294, 295, 296, 53/297, 298, 299, 300, 301, 302, 303, 53/305, 306, 307, 308, 309, 310, 311, 53/313, 314, 315, 317, 319, 320, 321, 53/324, 328, 329, 329.2, 329.3, 330, 53/331.5, 332, 333, 334, 338, 340, 341, 53/342, 343, 344, 345, 349, 350, 351, 53/352, 353, 354, 355, 356, 357, 359, 53/361, 363, 366, 367, 368, 369, 370.2, 53/370.3, 372.9, 374.4, 375.9, 376.4, 53/376.5, 376.7, 377.2, 377.6, 378.3, 53/381.1, 381.4, 382.1, 382.3, 383.1, 53/387.2, 389.1, 390, 391, 396, 397, 398, 53/399, 407, 409, 410, 411, 412, 413, 53/414, 415, 419, 420, 424, 425, 426, 53/427, 428, 430, 432, 434, 436, 438, 53/440, 441, 442, 443, 444, 445, 446, 53/447, 448, 449, 450, 451, 452, 453, 53/455, 456, 457, 458, 461, 462, 465, 53/467, 468, 469, 471, 472, 473, 474, 53/475, 477, 478, 48.1, 48.2, 48.4, 48.5, 53/48.7, 48.8, 48.9, 484, 485, 486, 487, 53/488, 489, 49, 490, 491, 492, 493, 495, 53/497, 502, 507, 510, 511, 52, 520, 521, 53/522, 525, 527, 528, 529, 531, 532, 53/537, 539, 541, 542, 543, 544, 55, 557, 53/558, 563, 564, 565, 566, 574, 578, 53/580, 582, 585, 587, 589, 590, 64, 67, 53/68, 70, 71, 72, 75, 76, 77, 88, 95, 53/DIG. 2; 206/0.5, 1.5, 100, 102, 128, 206/139, 140, 141, 144, 147, 149, 15, 206/152, 153, 154, 155, 158, 161, 167, 206/19, 190, 194, 195, 196, 197, 198, 206/203, 204, 205, 210, 216, 217, 219, 206/221, 222, 223, 226, 229, 232, 233, 206/244, 246, 247, 254, 256, 259, 260, 206/264, 268, 270, 273, 276, 277, 291.3, 206/305, 306, 308.2, 310, 313, 315.1, 206/315.9, 318, 319, 320, 321, 322, 325, 206/326, 327, 343, 346, 349, 361, 363, 206/364, 365, 366, 37, 370, 372, 379, 38, 206/382, 384, 385, 386, 388, 389, 391, 206/392, 394, 395, 397, 398, 403, 407, 206/408, 410, 411, 413, 414, 415, 416, 206/418, 419, 422, 423, 424, 427, 429, 206/430, 431, 433, 434, 438, 442, 443, 206/445, 446, 447, 448, 449, 45.28, 451, 206/453, 454, 455, 457, 459.1, 459.5, 206/460, 461, 469, 470, 476, 477, 480, 206/482, 484, 484.2, 485, 486, 487, 488, 206/489, 490, 493, 497, 499, 5, 504, 506, 206/508, 509, 510, 514, 515, 517, 518, 206/519, 521, 522, 523, 524.1, 524.3,

206/524.4, 524.6, 524.7, 524.8, 525, 526, 206/527, 528, 529, 53, 530, 532, 534, 206/539, 541, 555, 557, 558, 562, 564, 206/568, 569, 571, 579, 581, 583, 585, 206/586, 587, 588, 589, 590, 591, 592, 206/593, 594, 596, 597, 598, 599, 6, 600, 206/68, 701, 702, 722, 723, 725, 758, 206/763, 769, 774, 775, 776, 777, 779, 206/780, 781, 782, 783, 784, 8, 800, 803, 206/804, 805, 806, 807, 812, 815, 818, 206/820, 822, 823, 83.5, 830, 831, 94, 206/96; 215/10, 11.1, 11.6, 12.1, 12.2, 215/14, 2, 200, 201, 203, 209, 216, 217, 215/220, 226, 227, 228, 229, 230, 231, 215/232, 233, 235, 237, 240, 244, 246, 215/248, 250, 251, 252, 253, 254, 256, 215/257, 258, 26, 260, 261, 270, 271, 215/272, 273, 274, 275, 276, 277, 278, 215/279, 285, 286, 287, 291, 292, 293, 215/295, 297, 298, 299, 30, 300, 302, 215/303, 304, 305, 306, 307, 308, 309, 215/310, 311, 313, 316, 317, 320, 321, 215/322, 323, 324, 325, 326, 328, 329, 215/330, 331, 332, 333, 334, 336, 337, 215/340, 341, 343, 344, 346, 347, 348, 215/349, 350, 351, 352, 353, 354, 355, 215/358, 359, 363, 364, 365, 371, 373, 215/376, 380, 382, 383, 385, 386, 387, 215/388, 390, 392, 395, 396, 397, 399, 215/40, 41, 42, 43, 44, 45, 46, 47, 48, 49, 215/50, 6, 901, DIG. 1, DIG. 2, DIG. 3, 215/DIG. 7, DIG. 8; 220/200, 203.08, 220/203.29, 212, 212.5, 214, 229, 23.2, 220/23.4, 23.83, 23.87, 23.89, 23.9, 243, 220/254.1, 254.2, 254.3, 256.1, 257.1, 220/257.2, 258.2, 258.3, 258.5, 259.1, 220/259.3, 260, 265, 266, 268, 269, 270, 220/273, 274, 275, 277, 278, 279, 281, 220/282, 288, 289, 291, 293, 297, 303, 220/304, 310.1, 315, 316, 319, 323, 324, 220/326, 327, 328, 345.3, 351, 359.1, 220/359.2, 359.3, 359.4, 366.1, 367.1, 220/372, 375, 378, 380, 4.01, 4.15, 4.21, 220/4.24, 4.26, 4.28, 4.29, 495.01, 220/495.05, 495.06, 495.08, 495.11, 500, 220/506, 510, 519, 521, 522, 524, 560.01, 220/560.11, 560.15, 574, 574.1, 575, 578, 220/582, 586, 592.16, 592.17, 592.25, 220/592.26, 615, 618, 619, 62, 62.11, 220/62.12, 62.2, 62.22, 624, 627, 628, 220/631, 640, 641, 644, 651, 653, 658, 220/660, 662, 663, 669, 677, 703, 704, 220/705, 706, 707, 708, 709, 710, 711, 220/712, 713, 714, 716, 717, 718, 719, 220/721, 735, 737, 739, 740, 743, 757, 220/758, 763, 770, 775, 776, 780, 782, 220/783, 785, 786, 787, 788, 789, 790, 220/794, 796, 799, 8, 801, 803, 805, 810, 220/826, 835, 837, 839, 847, 86.1, 903, 220/906, 908, 910, 916, DIG. 15, 220/DIG. 19, 1.5, 2.3 R, 201, 203.01, 220/203.09, 203.16, 210, 211, 213, 215, 220/221, 23.86, 23.91, 231, 234, 252, 220/253, 254.4, 254.5, 254.7, 254.8, 220/254.9, 255, 255.1, 258.1, 258.4, 220/259.2, 259.5, 262, 263, 264, 271, 220/276, 283, 284, 285, 287, 290, 295, 220/296, 298, 300, 301, 302, 305, 320, 220/321, 345.1, 345.2, 345.4, 345.6, 348, 220/350, 360, 363, 368, 371, 373, 374, 220/4.02, 4.12, 4.22, 4.23, 4.27, 4.33, 220/475, 481, 482, 484, 495, 495.02, 220/495.03, 495.04, 495.07, 495.1, 503, 220/507, 508, 515, 523, 526, 528, 529, 220/530, 531, 532, 551, 555, 556, 560.02, 220/560.13, 565, 566, 567.1, 567.2, 568, 220/573.1, 573.2, 574.3, 590, 592.15, 220/592.2, 592.24, 592.27, 6, 600, 601, 220/602, 609, 612, 613, 617, 62.15, 220/62.18, 62.19, 620, 621, 623, 625, 220/626, 643, 645, 646, 652, 657, 659, 220/661, 666, 670, 671, 674, 675, 676, 220/678, 692, 694, 695, 697.7, 700, 220/710.5, 715, 720, 724, 727, 729, 730, 220/733, 738, 746, 751, 752, 756, 771, 220/772, 784, 791, 792, 793, 802, 806, 220/811, 812, 815, 821, 825, 827, 829, 220/830, 831, 832, 833, 834, 836, 838, 220/840, 841, 844, 845, 848, 849, 86.2, 220/87.1, 89.1, 902, 908.1, 908.2, 908.3, 220/909, 913, 915, 915.1, 919, DIG. 13, 220/DIG. 2, DIG. 20, DIG. 22, DIG. 27, 220/DIG. 32, DIG. 33, DIG. 9, FOR. 173; 229/125.03, 87.06; 493/100, 101, 102, 493/103, 104, 105, 106, 107, 108, 109, 493/110, 111, 114, 115, 116, 119, 12, 493/120, 121, 122, 126, 128, 129, 131, 493/132, 133, 136, 14, 141, 142, 144, 493/148, 149, 150, 152, 153, 154, 155, 493/156, 158, 159, 162, 163, 164, 165, 493/167, 171, 175, 176, 177, 180, 181, 493/183, 184, 185, 210, 211, 214, 218, 493/219, 225, 231, 232, 253, 264, 270, 493/274, 276, 279, 285, 287, 288, 292, 493/295, 296, 297, 298, 303, 309, 313, 493/315, 316, 317, 318, 319, 324, 329, 493/33, 331, 332, 336, 337, 338, 340, 493/343, 344, 372, 377, 379, 38, 380, 493/381, 385, 388, 39, 390, 397, 407, 493/416, 418, 429, 441, 442, 449, 453, 493/454, 460, 464, 465, 466, 468, 472, 493/474, 475, 52, 55, 56, 59, 61, 63, 66, 493/73, 74, 75, 76, 77, 79, 82, 83, 84, 85, 493/87, 88, 89, 907, 929, 93, 938, 941, 493/95, 956, 959, 962, 964, 966, 967, 493/968, 98, 99

See application file for complete search history.

(56) References Cited

U.S. PATENT DOCUMENTS

| | | | | | |
|---|---|---|---|---|---|
| 2,505,748 | A * | 5/1950 | Barbieri | B65D 3/10 229/5.5 |
| 2,746,669 | A * | 5/1956 | Arlington | B29C 66/12441 229/125.17 |
| 6,196,451 | B1 * | 3/2001 | Helms | B29C 45/14336 229/5.5 |
| 2004/0144786 | A1 * | 7/2004 | Chmela | B65D 55/0863 220/257.1 |
| 2008/0099481 | A1 * | 5/2008 | D' Amato | B65D 43/0262 220/276 |
| 2011/0233208 | A1 * | 9/2011 | Kim | B65D 43/0212 220/254.1 |

(56) References Cited

U.S. PATENT DOCUMENTS

FOREIGN PATENT DOCUMENTS

| | | | | | |
|---|---|---|---|---|---|
| GB | 321716 | | | 11/1929 | |
| JP | 2004001892 | A | * | 1/2004 | ............. B65D 43/02 |
| KR | 20220020505 | A | * | 2/2022 | ......... B65D 43/0212 |

* cited by examiner

LID FROM PAPER, PAPERBOARD OR PAPER-LIKE MATERIAL, AND METHOD FOR PRODUCING A LID

TECHNICAL FIELD

The invention relates to a lid from paper, paperboard or paper-like material for a container, wherein the lid is produced from an integral planar blank and has a lid plate and a lid collar, wherein the lid collar proceeds from a periphery of the lid plate, wherein the lid collar is formed from at least two plies of the planar blank, wherein a first ply of the lid collar, proceeding from the periphery of the lid plate, extends to a periphery of the lid collar, and wherein a second ply of the lid collar, proceeding from the periphery of the lid collar, extends along a radially inner side of the lid collar and terminates at a second ply peripheral end portion.

BACKGROUND AND SUMMARY

A lid can be provided for latching to a container having a so-called mouth roll. In lids from paper, paperboard or paper-like material for a container, which are produced from an integral planar blank, it is problematic that the second, inner ply of the lid collar has to be sealed to the outer ply of the lid collar by means of an adhesive or a plastics-material coating, such that the lid collar maintains its shape. Plastics-material coatings here are problematic from an ecological point of view.

A lid from paper, paperboard or paper-like material for a container, and a method for producing a lid, are to be improved by the invention such that producing the lid from paper, paperboard or paper-like material which is free of plastics material is possible.

In a lid from paper, paperboard or paper-like material for a container it is provided that the lid is produced from an integral, planar blank and has a lid plate and a lid collar, that the lid collar proceeds from a periphery of the lid plate, that the lid collar is formed from at least two plies of the planar blank, that a first ply of the lid collar, proceeding from the periphery of the lid plate, extends to a periphery of the lid collar, and that a second ply of the lid collar extends from the periphery of the lid collar on a radially inner side thereof to a second ply peripheral end portion, wherein the second ply peripheral end portion at least in portions is received in a groove in a region of the periphery of the lid plate.

In that the second ply peripheral end portion of the lid collar at least in portions is received in a groove in the region of the periphery of the lid plate, the peripheral end portion is mechanically fixed in the groove; in other words, the flap of the lid collar that is formed by the second ply latches into the groove. The second ply of the lid collar is fixed solely by the latching action. As a result, it is possible for the lid according to the invention not to be produced from coated paper, paperboard or paper-like material, or it is possible to completely dispense with adhesive in the production of the lid.

The lid according to the invention is produced from paper, paperboard or paper-like material. Such lids are usually also referred to as paperboard lids. A material which can be processed like paper or paperboard is referred to as a paper-like material. Paper or paperboard comprises fibers and consequently cannot be elongated in practical terms and also be compressed only to a very minor extent. In particular, paper, paperboard or paper-like material cannot be vacuum-formed or heavily deformed in general. Plastics material which cannot be stretched, or stretched only to a very minor extent, is also considered to be paper-like material, for example. In the production of a lid from such a paper-like plastics material, the lid has to be produced from a planar blank which is then deformed to the extent permitted by the paper-like plastics material. In other words, the lid according to the invention from paper, paperboard or paper-like material is always produced in the same way, specifically by deforming an integral planar blank.

The lid according to the invention can be configured as a so-called snap-on lid or else as a so-called snap-in lid. In a snap-on lid, the internal circumference of the lid collar is larger than the external circumference of the upper periphery of a container onto which the lid is then placed. In the state placed thereon, the lid collar then surrounds the external wall of the container on the upper end of the latter. In a snap-in lid, the external circumference of the lid collar is slightly smaller than the internal circumference of the container on the upper end of the latter. The lid collar is thus snapped into the upper end of the container. In the state placed thereon, the external wall of the container by way of the upper region of the former then surrounds the lid collar at least in portions.

In a refinement of the invention, the groove in the lid plate is configured to be encircling.

In this way, the periphery of the second, inner ply of the lid collar can be latched and fixed across the entire circumference of the lid plate.

In a refinement of the invention, the lid plate has an upper side and a lower side, wherein the second ply of the lid collar from the periphery of the lid collar extends toward the lower side of the lid plate, and an encircling protrusion is disposed on the upper side of the lid plate, wherein the groove is disposed on a side of the protrusion that faces the lower side of the lid plate.

The groove for receiving the peripheral end portion of the second ply of the lid collar is created simultaneously on the lower side of the lid plate while shaping the encircling protrusion on the upper side of the lid plate. For example, the encircling protrusion, and thus the encircling groove, can be embossed or curled in the planar blank.

In a refinement of the invention, the first ply of the lid collar forms a wall of the groove.

In this way, the groove is disposed directly on the outer periphery and thus at the transition from the lid plate to the lid collar. In the fixed state, the first ply and the second ply of the lid collar can therefore lie directly on top of each other such that the lid collar can be configured to be very stable and with double the wall thickness of the planar blank.

In a refinement of the invention, the groove is spaced apart from the periphery of the lid plate.

In the context of the invention it may be expedient for the groove to be spaced apart from the periphery of the lid plate. In this case, the lid collar is still composed of two plies of the planar blank, said plies however being mutually spaced apart on the lower side of the lid plate.

In a refinement of the invention, the lid plate has an upper side and a lower side, wherein the second ply of the lid collar, from the periphery of the lid collar, extends in the direction of the lower side of the lid plate, wherein a protrusion which extends away from the lid plate is disposed on the lower side of the lid plate, wherein the protrusion is spaced apart from the periphery of the lid plate, and wherein the groove is formed between the protrusion and the first ply of the lid collar.

For example, the protrusion can be formed in that embossing is performed from the upper side of the lid plate, said embossing then configuring a protrusion on the lower side of the lid plate. The peripheral end portion of the second ply of the lid collar can then be moved across this protrusion and latch behind this protrusion. The groove is then formed between the protrusion and the first ply of the lid collar.

In a refinement of the invention, the peripheral end portion of the second ply of the lid collar is secured in the groove by means of an adhesive.

Fixing the peripheral end portion of the second ply of the lid collar in the groove can be improved in this way.

The adhesive is configured as a hot-melt adhesive, for example.

In a refinement of the invention, the planar blank from which the lid is produced is not provided with a sealable plastics-material coating.

As a result of the mechanical fixing of the peripheral end portion of the second ply of the lid collar in the groove, a sealable plastics-material coating can be dispensed with. As a result, the lid according to the invention can be produced in a very ecologically friendly way and can readily be produced from paper material which is rapidly biologically degradable, for example.

In a refinement of the invention, the lid collar on the radially inner side thereof has at least one second protrusion which extends radially inward.

By means of such a protrusion, the lid collar can latch onto a cup with a mouth roll, or an encircling protrusion which protrudes radially outward. In this instance, the mouth roll lies between the second protrusion and the lower side of the lid plate of the lid. As a result, the lid is securely held on the container.

In a refinement of the invention, the second protrusion is configured as a corrugation in the first ply and/or of the second ply of the lid collar.

Such a corrugation can be curled or embossed in the lid collar, for example, and is in particular adapted to the dimensions of a mouth roll. For example, the corrugation can also be configured such that the corrugation receives a portion of the mouth roll of the container.

In a refinement of the invention, a convex side of the corrugation lies radially on the inside.

In this way, a second protrusion which in the radial direction protrudes inward is formed by means of the corrugation, wherein the mouth roll in this instance can be received between the second protrusion and the lower side of the lid plate.

In a refinement of the invention, the second protrusion is a thickening of the second ply of the lid collar.

A thickening can be achieved by compressing the second ply, for example. A thickening can however also be achieved by curling a corrugation and subsequently compressing the corrugation, for example.

In a refinement of the invention, the periphery of the second ply of the lid collar is provided with clearances or is configured so as to be wave-shaped.

Such a design of the periphery of the second ply minimizes material stresses when folding over the second ply. In this instance, the periphery of the second ply of the lid collar is inevitably fixed in the groove only in portions.

In a refinement of the invention, the second ply of the lid collar has incisions which proceed from the periphery of the second ply, wherein portions disposed between the incisions are disposed so as to at least in portions run obliquely radially inward.

In this way, barb-type elements on the lid collar can be formed by way of the portions that run obliquely inward. The lid can then be pushed onto a mouth roll until the obliquely disposed portions snap in behind the mouth roll.

The lid is then securely fixed on the container. The portions can be configured such that the lid is either placed so as not to be releasable in a non-destructive manner, or is placed as to be releasable upon overcoming specific resistance.

In a refinement of the invention, the lid collar, in particular on the periphery thereof that is spaced apart from the lid plate, has at least one protrusion that extends radially outward.

In a snap-in lid, such a protrusion that extends radially outward is expedient for forming a detent which defines a maximum depression depth of the lid when inserting the latter into a container. The protrusion can encircle the entire circumference of the lid, but this is not mandatory in the context of the invention. The encircling protrusion that extends radially outward can be established in a simple manner, for example, by forming the lid collar by bending the latter radially outward by 90°. For example, two mutually opposite protrusions which extend in each case across an angle of approximately 100° to 150°, in particular 130° to 140°, about the circumference of the lid collar are provided. An extraction aid for the lid can then be disposed between these two radially outward extending protrusions, for example.

In a refinement of the invention, the lid collar, in particular on the periphery thereof that is spaced apart from the lid plate, has at least one protrusion that extends radially inward.

In this way, an extraction aid for a user can be provided in a very simple manner, in particular in a snap-in lid. The user reaches into the lid and places one or a plurality of fingers below the radially inward protruding protrusion. As a result, the user can extract the lid in a simple manner by way of an upward movement.

The radially inward protruding protrusion can extend across the entire circumference of the lid. For example, a first protrusion that extends radially outward and defines a depression depth of the lid can be provided, and a second protrusion that extends radially inward and in the height direction is disposed at a different position that the radially outward extending protrusion can be provided. However, the radially inward extending protrusion advantageously extends only across a sub-region of the circumference, and at least one radially outward extending protrusion is provided at the same height in a different sub-region of the circumference. For example, two mutually opposite and radially inward extending protrusions are provided. The radially inward extending protrusions here can extend across the circumference of the lid by an angle between 30° and 60°, in particular 45° to 55°.

The object on which the invention is based is also achieved by a method for producing a lid having a lid plate and a lid collar which proceeds from the periphery of the lid plate. The method includes configuring a pot-type intermediate element from a planar blank from paper, paperboard or paper-like material; folding over an encircling wall assembly of the pot-type element such that a first ply of the lid collar forms in the radial direction, an outside of the lid collar, and a second ply of the lid collar forms an inside of the lid collar in the radial direction; forming a groove in a radially outer region of the base of the pot-type intermediate element; and latching at least one portion of the second ply peripheral end portion into the groove.

Using the method according to the invention, an integral lid from paper, paperboard or paper-like material which has a two-ply stable lid collar and can nevertheless be produced without the use of an adhesive or a sealable coating can be produced. This because the peripheral end portion of the inner second ply of the lid collar latches in the groove and is mechanically fixed as a result. The method according to the invention can also readily be used together with an adhesive, for example a hot-melt adhesive, or coated paper material. There are paper materials which are provided with a plastics-material coating and provide only very minor cohesion when sealing. An integral lid can also be produced by way of the method according to the invention using such materials. In the context of the invention, the planar material for producing the lid can also be provided with a sealable dispersion coating and/or with a protective varnish against invading liquids. For example, the fixing of the peripheral end portion of the second ply of the lid collar in the groove can also be improved in that the peripheral end portion is fixed in the groove by way of an adhesive. This can be advantageous when a very stable lid is to be produced, for example. However, even when the periphery of the second ply of the lid collar is fixed by way of an adhesive, the utilization of an adhesive thus only assists the mechanical fixing of the peripheral end portion of the second ply of the lid collar in the groove, as is already present according to the invention.

In the refinement of the invention the shaping of the groove is provided in a way that a portion of the first ply of the lid collar forms a lateral wall of the groove.

In this way, the groove is disposed directly on the periphery of the lid collar, and the second ply of the lid collar can bear in a planar manner on the first ply of the lid collar.

In the refinement of the invention the shaping of the groove is provided in a way that an encircling protrusion is configured on an upper side of the lid plate that lies opposite the lid collar, wherein the groove is disposed on a side of the protrusion facing the lower side of the lid plate.

In the refinement of the invention the shaping of the groove is provided in a way that the protrusion forms the outer periphery of the lid plate.

In this way, the lid plate is stabilized and an appealing design of the lid is also derived.

In the refinement of the invention, fixing at least portions of the peripheral end portion of the second ply in the groove by means of an adhesive is provided.

In this way, materially integral fixing in addition to the mechanical fixing of the peripheral end portion of the second ply in the groove can be provided.

In a refinement of the invention, the shaping of the lid plate by means of embossing the base of the pot-type intermediate element is provided.

In this way, the lid plate can be stabilized by embossings or stampings. For example, it is also possible for the lid plate to be provided with an insertion opening or a drinking opening, and for embossings or stampings to be provided in order to enable drinking from the container while the lid is placed on the latter. For example, an embossing can be provided such that liquid which has potentially made its way to the upper side of the lid plate runs back into the container.

Further features and advantages of the invention are derived from the claims and the description hereunder of preferred embodiments of the invention in conjunction with the drawings. Individual features of the various embodiments illustrated and described can be combined with one another in an arbitrary manner without departing from the scope of the invention. This also applies to the combination of individual features without other individual features, in connection with which they are illustrated and/or described. In the drawings:

DETAILED DESCRIPTION

Figure 1:
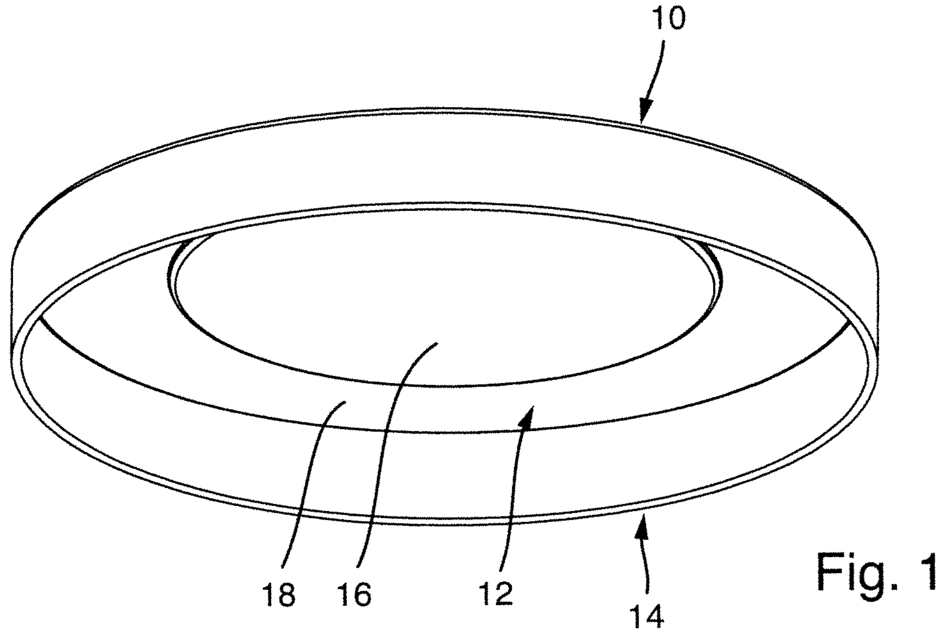
FIG. 1 shows a lid according to the invention and according to a first embodiment from obliquely below.

The illustration of FIG. 1 shows a lid 10 according to the invention and according to a first embodiment of the invention. The lid 10 has a lid plate 12 and lid collar 14 which protrudes from the lid plate 12. In the lid 10, the lid collar 14 protrudes from the lid plate 12 downward at an angle of 90°. Only the lower side of the lid plate 12 is visible in FIG. 1. The lid 10 is provided for placing on a container, usually a paperboard cup with a mouth roll, cf. FIG. 13 and FIG. 15. In the placed state, an upper side of the mouth roll of the paperboard cup bears on the lower side of the lid plate 12, and an inside of the lid collar 14 bears on an outside of the mouth roll.

Figure 13:
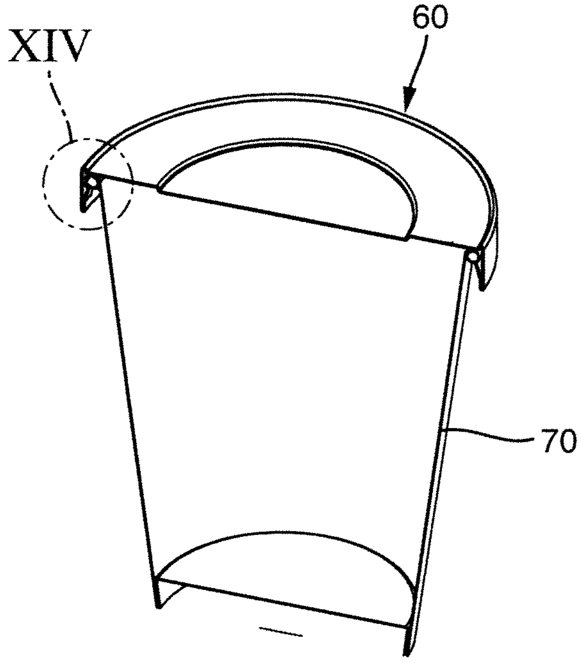
FIG. 13 shows a sectional view of the lid of FIG. 10 in the state placed on a paperboard cup with a mouth roll from obliquely above.
Figure 14:
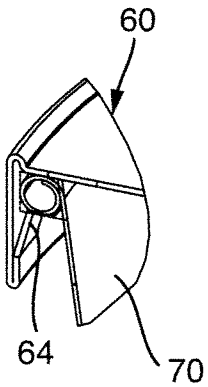
FIG. 14 shows the detail XIV from FIG. 13 in an enlarged illustration.
Figure 15:
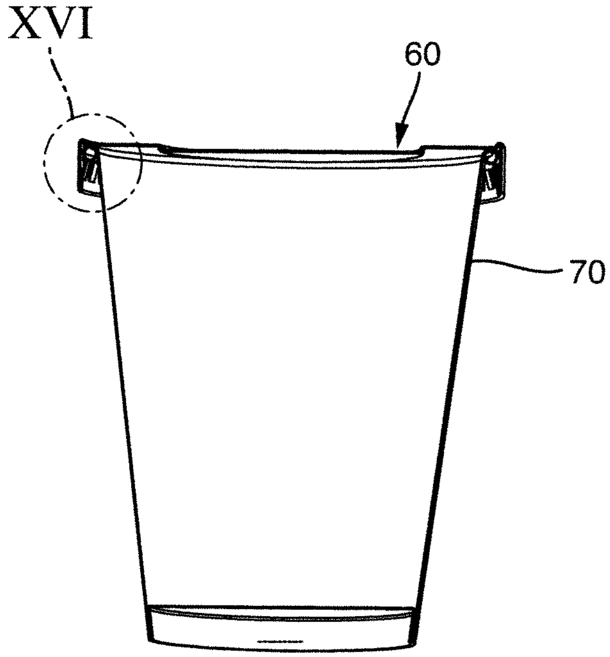
FIG. 15 shows the cup and the lid of FIG. 13 in a sectional view from slightly obliquely below.
Figure 16:
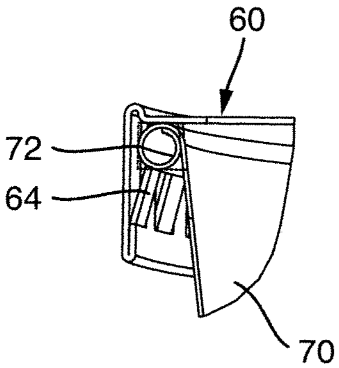
FIG. 16 shows the detail XVI from FIG. 15 in an enlarged illustration.

As can be seen from FIG. 1 and, for example, also from FIGS. 13 to 15, the lid 10 is configured as a so-called snap-on lid which is pushed over the upper end of a container, or of a sleeve, and especially over the mouth roll of a container. A lid which is configured as a so-called snap-in lid may also be provided in the context of the invention, see FIGS. 21 to 37. This type of lid is not pushed over the sleeve or the mouth roll of a container, but is inserted into a container. In order for the lid configured as a snap-in lid not to slide into the container, a holding element is typically situated on the outside of said lid. In the design of a snap-in lid from paper, the question is where the cutting edge of the planar blank, the so-called round tops, is to be positioned so as not to have any contact with the filling material, on the one hand, and not to expose the cutting edge so as not to be protected in relation to external environmental influences, on the other hand. Also in the case of a snap-in lid the invention offers the advantage that the periphery or peripheral end portion of the second ply of the lid collar, at least in portions, is received in a groove in the region of the periphery of the lid plate such that the periphery of the second ply is mechanically locked, on the one hand, and simultaneously covered and protected, on the other hand. In a snap-in lid without any plastics-material coating, the support of the preformed border, or of the external circumference of the lid collar, on the internal wall of the container is advantageous because the border, or the lid collar, is less dimensionally stable as a result of the absence of the plastics-material coating.

In the context of the invention, the lid 10 can be embodied so as to be circular, as illustrated in FIG. 1. Lids having a non-circular cross section, for example rectangular with rounded ends, oval, elliptic or the like are also within the scope of the invention.

The lid plate 12 has a central embossing 16 which is slightly depressed in comparison to the peripheral region 18 of the lid plate 12, for example depressed by 1 mm to 2 mm in the embodiment illustrated. The embossing 16 serves for reinforcing the lid plate 12. Embossings with a different shape, for example embossings for implementing ribs, webs or the like, may also be provided instead of the depression 16.

The lid plate 12 can also be provided with a drinking opening. For example, embossings or stampings can also be provided in the lid plate 12. For example, a drinking opening can be disposed at the lowest point of an embossing. Stampings and/or embossings can also be provided in the region of a drinking opening in order to render drinking from the drinking opening comfortable and to ensure that potential liquid on the upper side of the lid plate 12 runs back into the container.

The lid 10 is produced from an integral planar blank, as will yet be explained hereunder. The integral blank is composed of paper, paperboard or paper-like material. Such lids are usually also referred to as paperboard lids. Material that can be processed like paper or paperboard is referred to as paper-like material. Paper or paperboard comprises fibers and can consequently not be elongated in practical terms, and also be compressed only to a very minor extent. Paper, paperboard or paper-like material can in particular not be vacuum-formed or heavily deformed in general. The embossing 16, and optionally embossings or stampings in the region of a drinking opening or for reinforcing the lid 10 can, however, be incorporated when said embossings or stampings have only very minor dimensions, like the embossing 16 with a depth of only 1 mm to 2 mm in the embodiment illustrated. Plastics material which cannot be stretched, or stretched only to a very minor extent, is also considered to be paper-like material, for example. In the production of a lid from such a paper-like plastics material, the lid has to be produced from a planar blank.

Conventional lids from paper or paperboard are either configured in two parts, wherein the lid collar and the lid plate in this instance are adhesively bonded to each other or sealed to each other by means of a skirt. Integral lids in the region of the lid collar are typically embodied with two plies in order to be sufficiently stable. Connecting an inner ply to an outer ply likewise takes place by sealing a plastics-material layer on the surfaces of the planar blank. Such plastics-material layers indeed permit two plies to be sealed and thus two plies of the planar blank to be fixed to one another. However, such plastics-material layers are problematic in recycling because the lid in this instance is composed of two dissimilar materials. The biological degradability of the material from which the lid is produced is also compromised or even completely prevented. In contrast, the lid 10 according to the invention can be produced from non-coated paper, non-coated paperboard, or non-coated paper-like material and without the utilization of an adhesive, as is still to be explained hereunder. However, in the context of the invention the use of plastics-material coated paper, plastics-material coated paperboard, or paper-like material coated with adhesive or sealing material is not precluded. In the context of the invention, a planar blank from paper, paperboard or paper-like material, which for sealing is provided with a dispersion coating and/or a protective varnish against invading liquids, can also be used.

Figure 2:
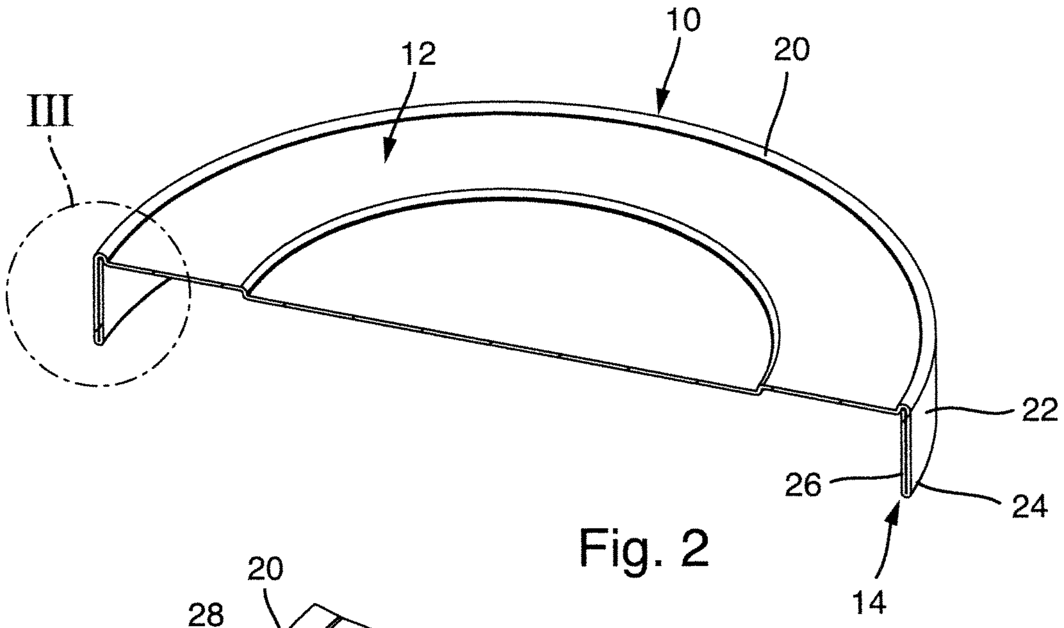
FIG. 2 shows a sectional view of the lid of FIG. 1 from obliquely above.
Figure 3:
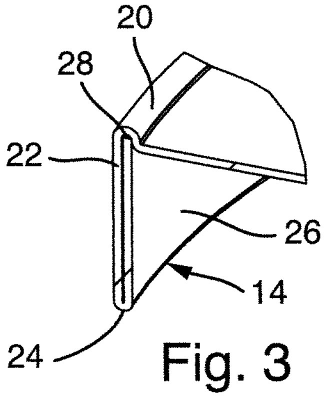
FIG. 3 shows the detail III from FIG. 2 in an enlarged illustration.

FIG. 2 shows a sectional view of the lid 10 of FIG. 1 from obliquely above. It can be seen in this view that the lid 10 is produced from an integral, planar blank and that the lid plate 12 is composed of one ply of the planar blank, and the lid collar 14 is composed of two plies of the planar blank. An encircling protrusion 20 having an approximately semicircular cross section can be seen on the outermost periphery of the lid plate 12. The planar blank is deformed in order for this protrusion to be formed. This can be performed by embossing from the lower side of the lid plate 12, cf. also FIG. 3, or optionally by suitably compressing the planar blank. Adjoining the protrusion 20, a first ply 22 of the lid collar 14 extends away from the lid plate 12. In the embodiment illustrated, the first ply 22 extends downward, so as to be perpendicular to the lid plate 12. The planar blank is folded over by 180° on the periphery 24 of the lid collar 14, which in the embodiment of FIGS. 1 to 3 forms the lower periphery of the lid collar 14 and thus has a maximum spacing from the lid plate 12. Proceeding from the periphery 24 of the lid collar 14, a second ply 26 of the lid collar 14 extends in the direction toward the lid plate 12 again. In the embodiment illustrated, the second, inner ply 26 bears in a planar manner on the first, outer ply 22 of the lid collar 14. The second ply 26 extends up to or terminates at a peripheral end portion. This peripheral end portion of the second ply 26 is received in a groove 28 which is formed on the lower side of the protrusion 20, see also FIG. 3. The groove is thus accessible from the lower side of the lid plate 12 and encircles the entire periphery of the lid plate 12. The second ply 22 in terms of length is configured such that the peripheral end portion of the second ply 26, and thus the upper delimitation of the second ply 26 in FIGS. 2 and 3, can be pressed into the groove 28 only counter to a resistance. Consequently the second ply 26 is folded over by 180° on the lower periphery 24 and latches in the groove 28 by pressure. The position of the second ply 22 is fixed as soon as the peripheral end portion of the second ply 26 is disposed in the groove 28, as is illustrated in FIGS. 2 and 3. No adhesive is required in order for this fixing to be achieved. Rather, the peripheral end portion of the second ply 26 is held in the position illustrated in FIGS. 2 and 3 as a result of the disposal of the former in the groove 28. As a result the lid 10 according to the invention can be produced without the utilization of an adhesive.

In the context of the invention, the fixing of the second ply 26, and especially of the peripheral end portion of the second ply 26, in the groove 28 can also be assisted by adhesive bonding in the groove 28, or else by planar or partial sealing of the second ply 26 to the first ply 22 of the lid collar 14.

Figure 4:
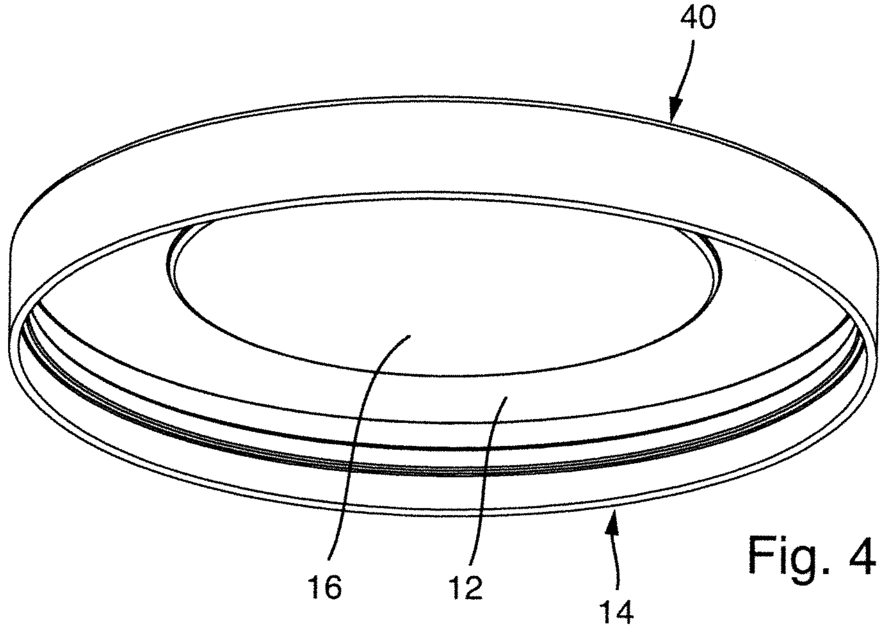
FIG. 4 shows a lid according to the invention and according to a second embodiment from obliquely below.

The illustration of FIG. 4 shows a lid 40 according to the invention and according to a second embodiment of the invention from obliquely below. Functionally equivalent elements, or even elements of identical construction, of the lid 40 are provided with the same reference signs as in the lid of FIGS. 1 to 3, and are not explained once again. The lid 40 is produced from an integral planar blank and has a lid plate 12 and a lid collar 14. Proceeding from an encircling protrusion 20 on the periphery of the lid plate 12, the lid collar 14 extends downward. A first ply 22 of the lid collar 14 adjoins the protrusion 20. The planar blank is folded over by 180° on the periphery 24 of the lid collar, and a second ply 26 of the lid collar extends in the direction toward the lower side of the lid plate 12 again. The peripheral end portion of the second ply 22 is again received in the groove 28 on the lower side of the protrusion and fixed as a result, see FIG. 6.

Figure 6:
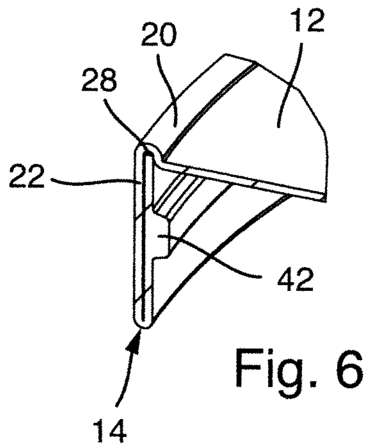
FIG. 6 shows the detail VI from FIG. 5 in an enlarged illustration.

It can be seen in FIG. 3 and FIG. 6 that the first ply 22 forms the outer lateral delimitation of the groove 28.

The inner ply 26 is provided with a thickened portion 42. This thickened portion 42 encircles the entire lid collar 14 and forms a protrusion that protrudes radially inward. The thickened portion 42 is produced, for example, in that a groove is molded in the second ply 26 and this groove is then grouted in order for the thickened portion 42 to be produced. The thickened portion 42 can also be produced by compressing the second ply 26. The thickened portion 42 has a predefined spacing from the lower side of the lid plate 12. This predefined spacing is adapted to the diameter of a mouth roll of a container. As a result, the mouth roll of a container can be received between the lower side of the lid plate 12 and the upper side of the thickened portion 42 that faces the lid plate 12. By means of the thickened portion 42, the lid 30 can latch onto the mouth roll of a container, for example of a paperboard container.

Figure 7:
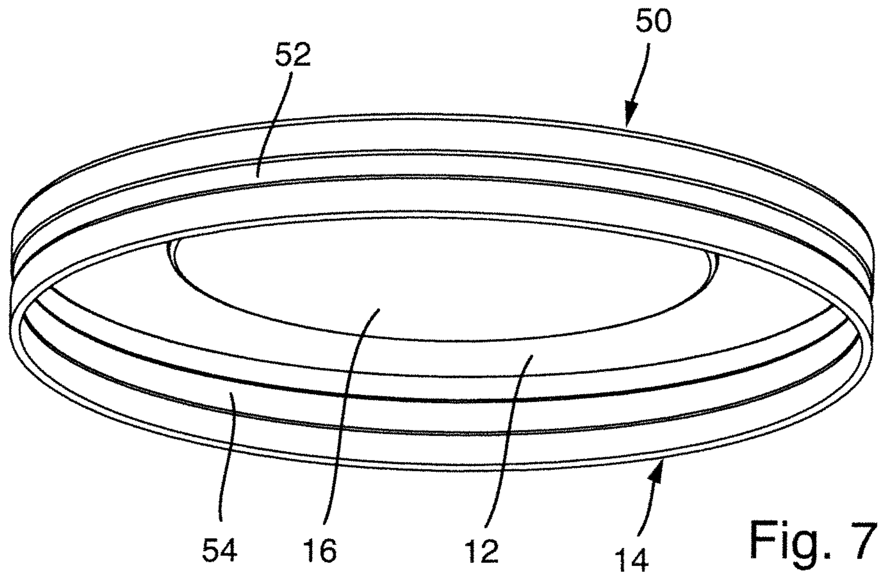
FIG. 7 shows an inventive lid according to a third embodiment of the invention from obliquely below.
Figure 8:
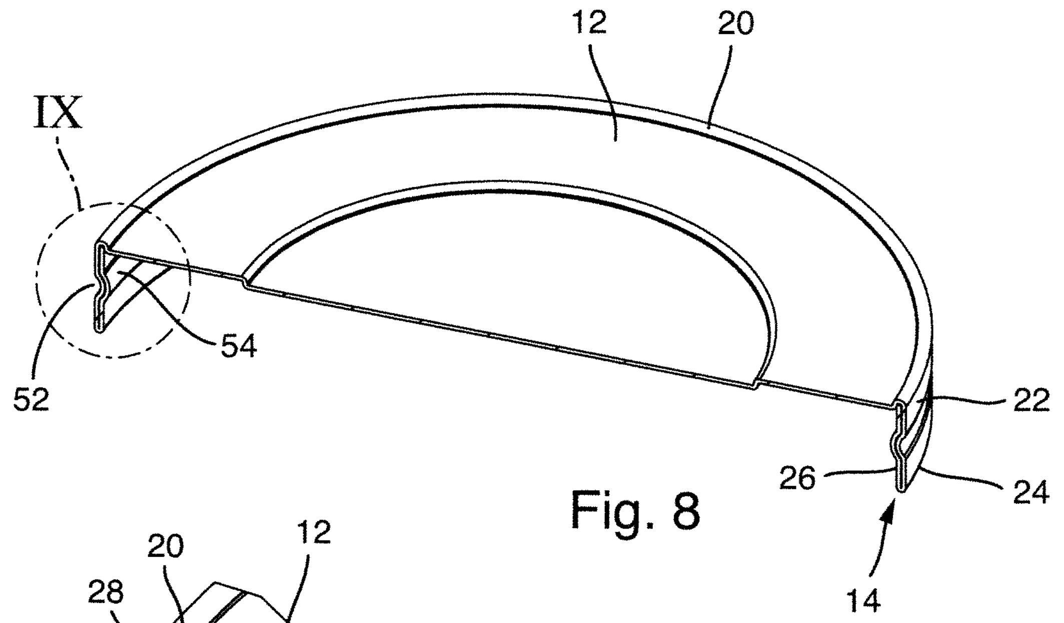
FIG. 8 shows a sectional view of the lid of FIG. 7 from obliquely above.
Figure 9:
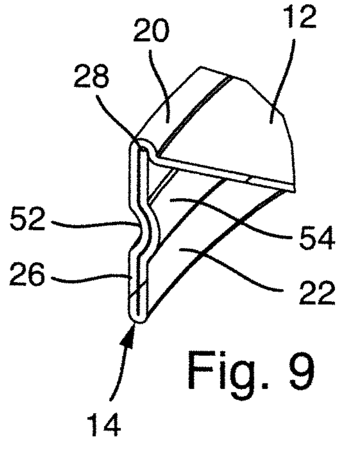
FIG. 9 shows the detail IX from FIG. 8 in an enlarged illustration.

FIG. 7 shows a lid 50 according to the invention and according to a third embodiment of the invention in a view from obliquely below. Elements of the lid 50 which are functionally equivalent, or even elements of identical configuration, to the lid 10 of FIGS. 1 to 3 are provided with the same reference signs, and are not explained once again. The lid 50 has a lid plate 12 and a lid collar 14 which protrudes from the periphery of the lid plate 12 so as to be perpendicular to the latter. As can be seen in FIGS. 8 and 9, an encircling protrusion 20 is configured on the periphery of the lid plate 12, a groove 28 in which the periphery of a second, inner ply 26 of the lid collar 26 is able to be received being disposed on the lower side of said protrusion 20. The first, outer ply 22 is folded over by 180° on the periphery 24 of the lid collar 14 such that the second, inner ply 26 of the lid collar extends in the direction toward the lid plate 12 again.

The lid collar 14 is provided with an encircling corrugation 52 which forms a protrusion 54 that protrudes radially inward. The corrugation 52 is embossed, for example curled, into the lid collar 14 from a radially outer side. The corrugation 52 is thus configured so as to be concave on the radially outer side of the lid collar 14. The corrugation 52 is configured so as to be convex on the radially inner side of the lid collar 14, and as a result forms the protrusion 54 that protrudes radially inward. The corrugation is incorporated in both plies 24, 26 of the lid collar 14. In the context of the invention, a corrugation may also be incorporated only in the second, inner ply 26 of the lid collar 14.

The inward-protruding protrusion 54 is disposed at a spacing from the lower side of the lid plate 12. As a result, the mouth roll of a container, for example of a paperboard container, can be received between the lower side of the lid plate 12 and the upper side of the protrusion 54 that faces the lower side of the lid plate 12. As a result, the lid 50 can latch onto a container with a mouth roll.

Owing to the inward-protruding protrusion 54 being configured in the shape of a segment of a circle, a lid can in this instance be easily removed again, applying only a minor force, from a container with a mouth roll.

Figure 10:
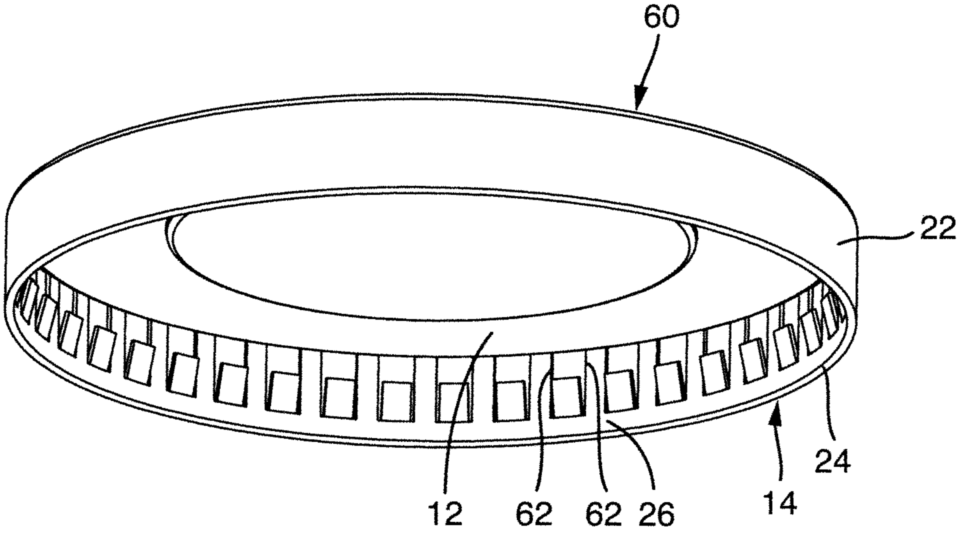
FIG. 10 shows a lid according to the invention and according to a fourth embodiment from obliquely below.

FIG. 10 shows a lid 60 according to the invention and according to a fourth embodiment of the invention. Elements of the lid 60 which are functionally equivalent, or even elements which are identical, to the lid 10 of FIGS. 1 to 3 are provided with the same reference signs, and are not explained once again.

Figure 11:
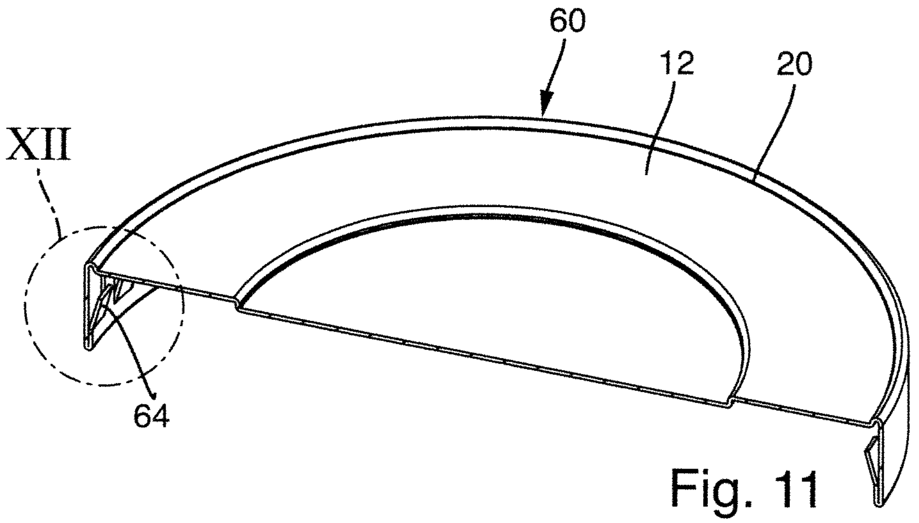
FIG. 11 shows a sectional view of the lid of FIG. 10 from obliquely above.
Figure 12:
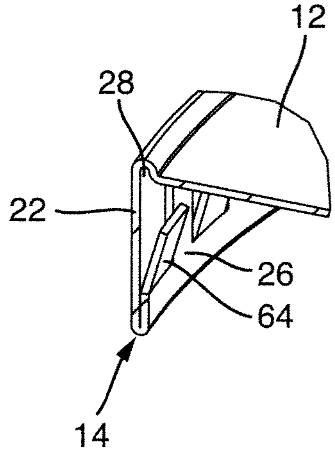
FIG. 12 shows the detail XII from FIG. 11 in an enlarged illustration.

The lid 60 has a lid plate 12 and a lid collar 14 which protrudes from the lid plate 12. An encircling protrusion 20, a groove 28 being disposed on the lower side thereof, is disposed on the upper side of the lid plate 12, see FIGS. 11 and 12. A first ply 22 of the lid collar 14, which is disposed radially on the outside, forms the radially outer lateral wall of the groove 28. The inner ply 26 of the lid collar 14 is folded over by 180° on the periphery 24 of the lid collar 14 and again extends in the direction toward the lower side of the lid plate 12. A periphery of the second, inner ply 26 of the lid collar 14 is in portions received in the groove 28 and as a result fixed in the position thereof illustrated in FIGS. 10 to 12.

The second ply 26 is provided with a plurality of incisions 62 which are disposed so as to be mutually parallel and, so as to be perpendicular to the periphery of the second ply 26, run in the direction toward the periphery 24 of the lid collar 14. Material portions that lie between two incisions 62 are either disposed so as to be parallel to the first ply 22 and, by way of the periphery of said material portions, received in the groove 28, or portions 64 between two adjacent incisions 62 are shortened and protrude radially obliquely inward. As can be readily seen in FIG. 12, the portions 64 protrude obliquely inward in the direction toward the lower side of the lid plate 12 and, as a result, form barb-type elements. Portions 64 are distributed about the entire circumference of the lid collar 14, on the radially inner side thereof, and are uniformly spaced apart from one another.

When the lid 60 is pushed onto a mouth roll of a container, for example of a paperboard container, the portions 64 are initially deflected outward until the latter are disposed so as to be approximately parallel to the first, outer ply 22 of the lid collar 14. As soon as the mouth roll then impacts the lower side of the lid plate 12, the portions 64 can spring back to the position shown in FIGS. 10 to 12. As a result, the lid 60 is then securely fastened to the mouth roll of the container. This state can be readily seen in FIGS. 13 to 16. It can also be readily seen in FIGS. 13 to 16 that the lid 60 typically cannot be removed from the container 70 again in a non-destructive manner. At least some of the portions 64 will be completely bent back or possibly even torn off when the container is removed. As a result, it can be ensured that the lid 60 is very securely held on the mouth roll 72 of the cup 70.

Figure 5:
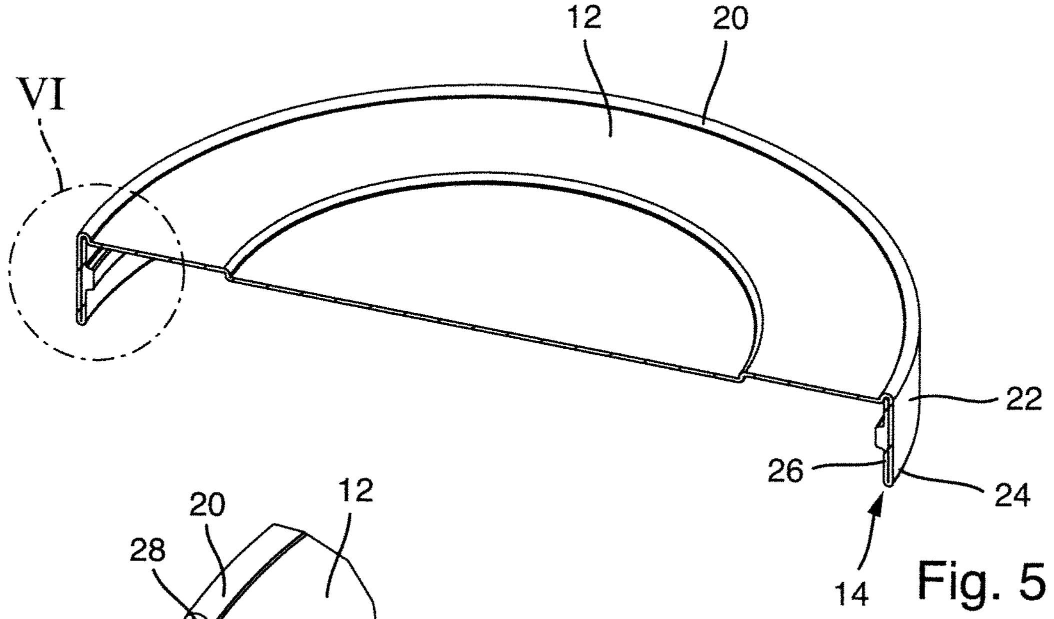
FIG. 5 shows a sectional view of the lid of FIG. 4 from obliquely above.
Figure 17:
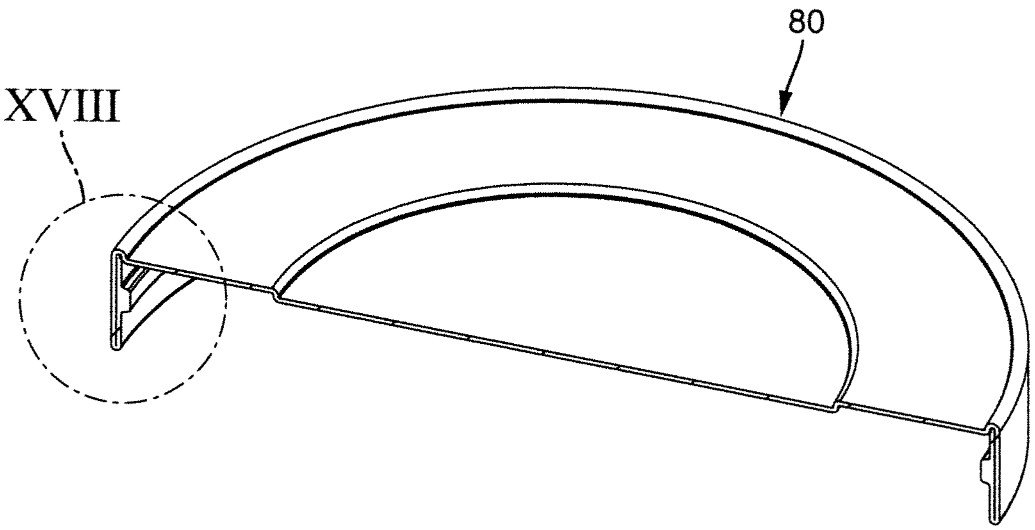
FIG. 17 shows a sectional view of a cup according to the invention and according to fifth embodiment from obliquely above.

The illustration of FIG. 17 shows a lid 80 according to the invention and according to a fifth embodiment of the invention, said lid 80 being of a construction substantially identical to that of the lid 40 of FIGS. 4 to 6. Therefore, only the points of differentiation in comparison to the lid 40 of FIGS. 4 to 6 will be explained.

Figure 18:
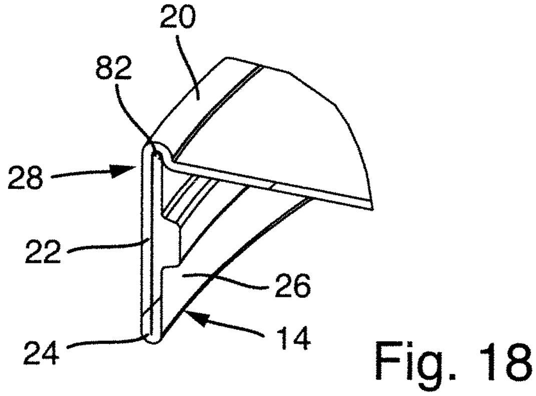
FIG. 18 shows the detail XVIII from FIG. 17 in an enlarged illustration.

As opposed to the lid 40 of FIGS. 4 to 6, the periphery of the second ply 26 of the lid collar 14 in the lid 80 is secured on the lower side of the protrusion 20 by means of an adhesive bead 82 in the groove 28, see FIG. 18. The adhesive bead 82 may be composed of a hot-melt adhesive, for example, and be incorporated in the groove 28 before the second ply 26 is completely folded over by 180° on the periphery 24 of the lid collar 14. As soon as the periphery of the second ply 26 has been pushed into the groove 28, the adhesive bead 82 solidifies and, as a result, reliably secures the periphery of the second ply 26 in the groove 28. As a result, the lid 80 can be configured so as to be even more stable in comparison to the lid 40.

Figure 19:
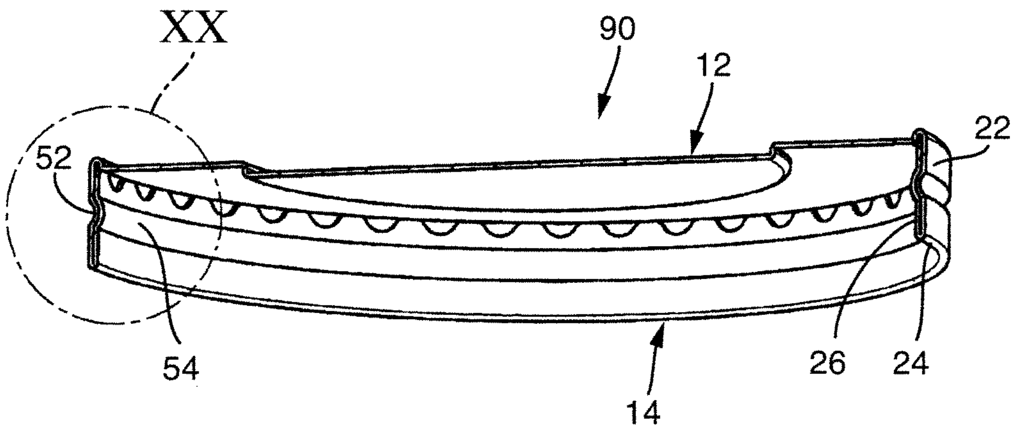
FIG. 19 shows a sectional view of a lid according to the invention and according to a sixth embodiment from obliquely below.

The illustration of FIG. 19 shows a sectional view of a lid 90 according to the invention and according to a sixth embodiment of the invention from obliquely below. The lid 90 is of a configuration which is substantially identical to that of the lid 20 of FIGS. 7 to 9. Therefore, only the points of differentiation in comparison to the lid 20 of FIGS. 7 to 9 will be explained.

Figure 20:
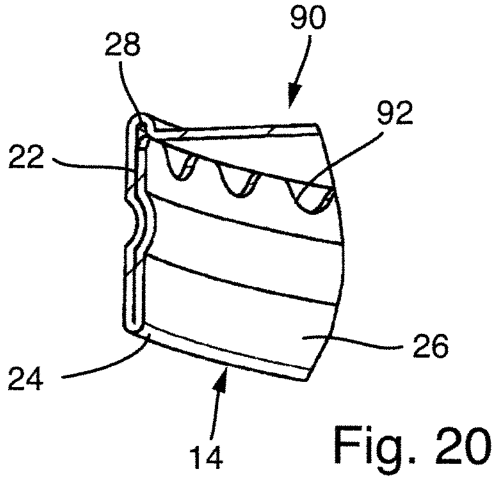
FIG. 20 shows the detail XX from FIG. 19 in an enlarged illustration.

As opposed to the lid 20 of FIGS. 7 to 9, the periphery 92 of the second ply 26 of the lid collar 14 is not configured so as to be smooth but is provided with a wave cut, in other words configured so as to be wave-shaped, see also FIG. 20. In other words, the periphery 92 of the second ply 26 of the lid collar 14 has a sinusoidal profile. As a result, portions of the periphery 92 come to engage with the groove 28 once the second ply 26 has been folded over by 180° at the location of the periphery 24 of the lid collar 14. However, the engagement of only portions of the periphery 92 in the groove 28 is sufficient in order to achieve secure fixing of the second ply 26 in the position illustrated in FIG. 20. The wave shape, or the wave cut, of the periphery 92 minimizes material stresses when folding over the second ply 26. As a result, deformations during folding over are reduced, and the folding over of the second ply 26 is facilitated.

The portions of the periphery 92 that are disposed in the groove 28 can additionally be secured in the groove 28 by an adhesive. The two plies 22, 26 of the lid collar 14 can also be fixed to each other by sealing when the planar blank from which the lid 90 is produced is at least partially coated with a sealable plastics material or a sealable dispersion coating. In principle however, the lid 90 can also be produced without the utilization of an adhesive, and also with a non-coated blank from paper, paperboard or paper-like material, or with a blank from paper, paperboard or paper-like material that is only coated with a protective varnish against invading liquids. This is because the latching of portions of the periphery 92 in the groove 28 ensures secure mechanical fixing of the second ply 26 and a stable embodiment of the lid collar 14 and of the lid 90 overall.

Figure 21:
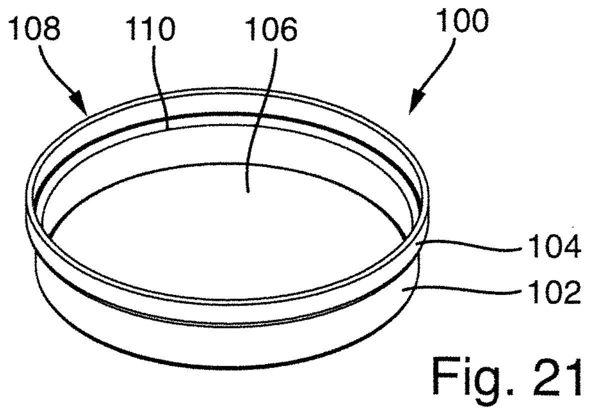
FIG. 21 shows a view of a lid according to the invention and according to a seventh embodiment from obliquely above.

FIG. 21 shows a lid 100 according to the invention and according to a further embodiment. The lid 100 is configured as a so-called snap-in lid and is inserted into the open end of a sleeve or of a container such that lower portion 102 of a lid collar in FIG. 21 comes to lie on the inside of the external wall of the container. An upper portion 104 of the lid collar is widened in a radially outward manner. As a result, an encircling shoulder is configured at the transition between the lower portion 102 and the upper portion 104, said shoulder forming a detent which restricts the depression depth of the lid 100 when the lid 100 is pressed into the open end of a container or of a sleeve. The lid 100 is integrally configured and has a lid plate 106 and the lid collar 108 which protrudes upward from the lid plate 106 so as to be substantially perpendicular to the latter.

Figure 23:
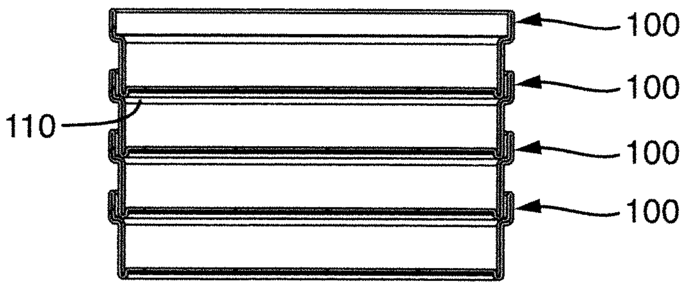
FIG. 23 shows a section view of the stacked lids from FIG. 22.

The lid collar 108 is configured so as to have two plies in the lower portion 102 as well as in the upper portion 104, see also FIG. 23. The lid collar 108 is folded over by 180° on the upper periphery thereof in FIG. 21, and the folded-over portion is then latched into a groove on the periphery of the lid plate 106, said groove not being visible in FIG. 21. The deformation of the two-ply lid collar 108 can take place simultaneously or subsequently such that the lower portion 102 and the upper portion 104, widened in a radially outward manner, are formed.

An encircling shoulder 110 is likewise configured on the inside of the lid 100. This shoulder 110 serves as a detent when stacking a plurality of lids 100 of the same type.

Figure 22:
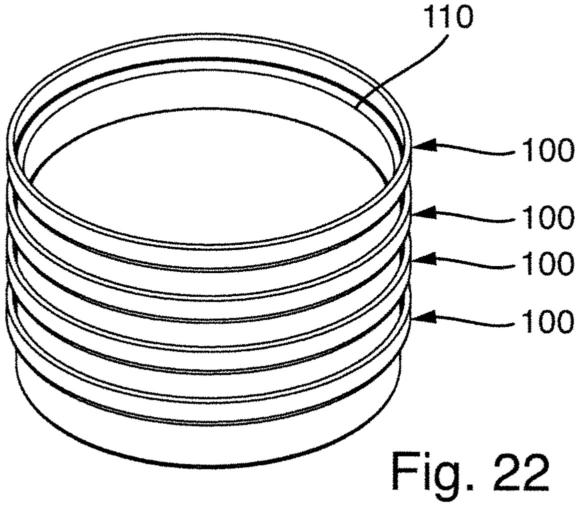
FIG. 22 shows a plurality of the lids from FIG. 21 in the stacked state.

FIG. 22 shows a total of four lids 100 of the same type that are nested in one another. It can be seen that the respective upper lid 100 can be pushed into a lower lid 100 only so far until the lower periphery of the lid collar in FIG. 21, which then transitions to the lid plate 106, bears on the encircling inner shoulder 110.

This can also be seen in FIG. 23. In this way, numerous lids 100 can be stacked without the risk of the stacked lids 100 being wedged in one another. This is a substantial advantage in particular when the lids 100 are to be removed rapidly and without problems from a high storage stack so as to be placed onto a container filled with a beverage. As a result, the lids 100 can be removed by hand from a very high stack with numerous lids 100.

Figure 24:
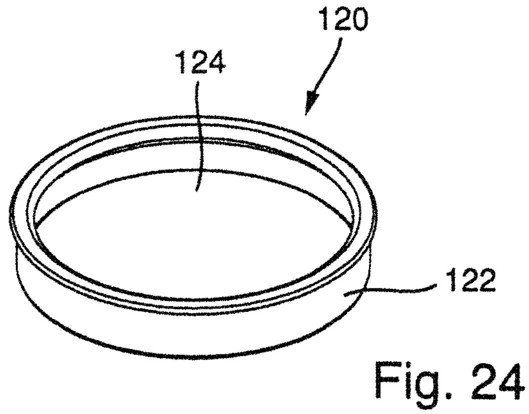
FIG. 24 shows a view of a lid according to the invention and according to an eighth embodiment from obliquely above.
Figure 25:
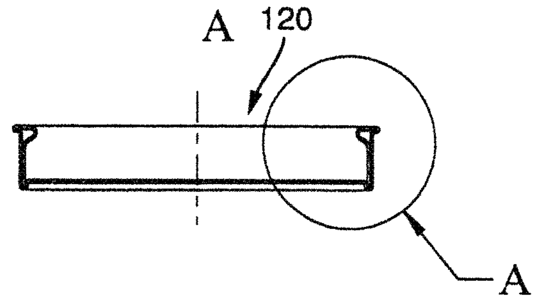
FIG. 25 shows a sectional view of the lid of FIG. 24.

FIG. 24 shows a further lid 120 according to the invention and according to a further embodiment of the invention. The lid 120 is likewise configured as a snap-in lid, such that in the state placed on a container a portion 122 of the lid collar by way of the external side thereof bears on an inside of the shell of a container or of a sleeve. The lid collar 122 proceeds from a lid plate 124. The lid 120 is integrally configured, see also FIGS. 25 and 26.

Figure 26:
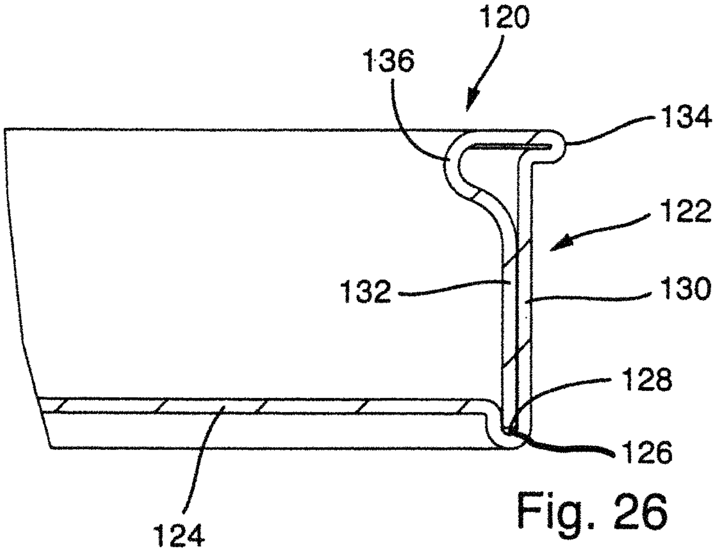
FIG. 26 shows the enlarged detail A from FIG. 25.

A groove 126 in which the peripheral end portion 128 of the lid collar is received is provided on the outer periphery of the lid plate 124. FIG. 26 shows the detail A of the sectional view of the lid 120 from FIG. 24, and it can be seen that the peripheral end portion 128 of the lid collar is latched in the groove 126. The lid collar 122 has a first, outer ply 130 which proceeds from the lid plate, or the groove 126 in the lid plate. The outer ply 130 is angled by 90° in relation to the lid plate 124. The lid collar 122 has a second, inner ply 132 which is disposed parallel to the outer ply 130 and which on the upper periphery of the lid collar 122 is connected to the outer ply 130. The peripheral end portion 128 forms the lower peripheral end portion of the inner ply 132. As a result of the peripheral end portion 128 being received in the groove 126 and latched in the latter, the inner ply 132 cannot move away from the position illustrated in FIG. 26. As a result, the lid 120 can be produced from a non-coated paper material because the inner ply 122 of the lid collar 122 is mechanically held so as to be parallel to the outer ply 130.

The lid collar 122 on the periphery thereof that is spaced apart from the lid plate 124 and lies at the top in FIG. 26 has a protrusion 134 that extends radially outward. This protrusion 134 forms a detent which delimits the depression depth of the lid 120 when the latter is pressed into the open end of a sleeve or of a container.

The lid collar 122 on the upper end thereof in FIG. 26 also has a protrusion 136 that protrudes radially inward. This radially inward protruding protrusion 136 forms an extraction aid. In the depressed state of the lid 120, a user can grip below the protrusion 136 with one or a plurality of fingers and, as a result, extract the lid 120 in a simple manner upward from the container or from the sleeve.

In order for the radially outward extending protrusion 134 to be shaped, the outer ply of the lid collar 130 is bent radially outward by 90° and after a short distance of a few millimeters bent inward by 180° again. For shaping the radially inward extending protrusion 136, the inner ply 132 is bent downward by 90°, then guided at an angle of almost 45° in relation to the outer ply 130 and finally bent again such that said inner ply 132 runs parallel to the outer ply 130 and into the groove 126. As a result, the radially inward extending protrusion 136 has a significantly larger bending radius than the radially outward extending protrusion 134 and, as a result, can be more easily gripped by a human finger. In the context of the invention however, it is of course also possible for the radially outward extending protrusion 134 and the radially inward protruding protrusion 136 to be configured in the same way and to be mutually symmetrical, for example.

Figure 27:
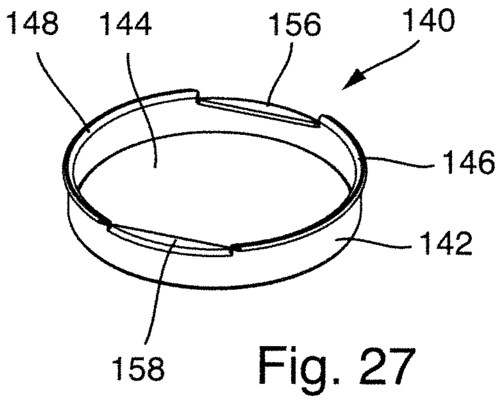
FIG. 27 shows a view of a lid according to the invention and according to a ninth embodiment from obliquely above.

FIG. 27 shows a lid 140 according to the invention and according to a further embodiment. The lid 140 is configured as a snap-in lid and likewise produced from an integral, planar blank. A lid collar 142 in the region of the periphery thereof that is spaced apart from the lid plate 144 has two radially outward extending protrusions 146, 148. The protrusions 146, 148 are configured by bending the outer ply of the lid collar 142 radially outward by 90° and then, following a short distance of a few millimeters, again radially inward by 180°, see FIG. 31. In the region of the radially outward extending protrusions 146, 148, the inner ply of the lid collar is then bent downward again by 90° and then runs parallel to the outer ply of the lid collar up to the groove 150 on the outer periphery of the lid plate 144. The peripheral end portion of the inner ply of the lid collar 142 is received in the groove 150, see FIG. 30 and FIG. 31.

Figure 29:
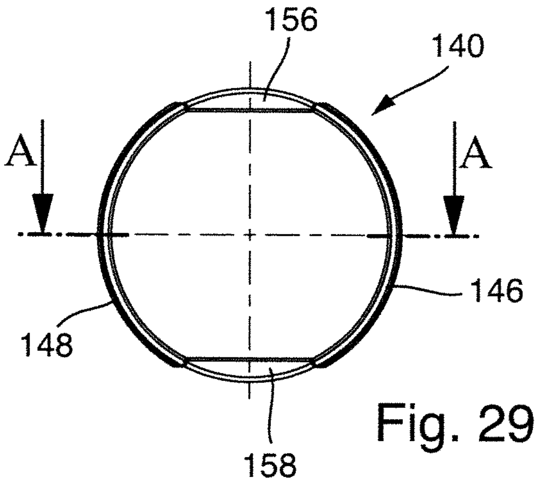
FIG. 29 shows a plan view onto the lid of FIG. 27.
Figure 30:
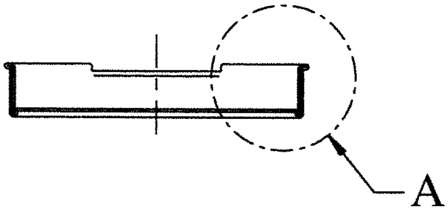
FIG. 30 shows a view onto the section plane A-A in FIG. 29.
Figure 31:
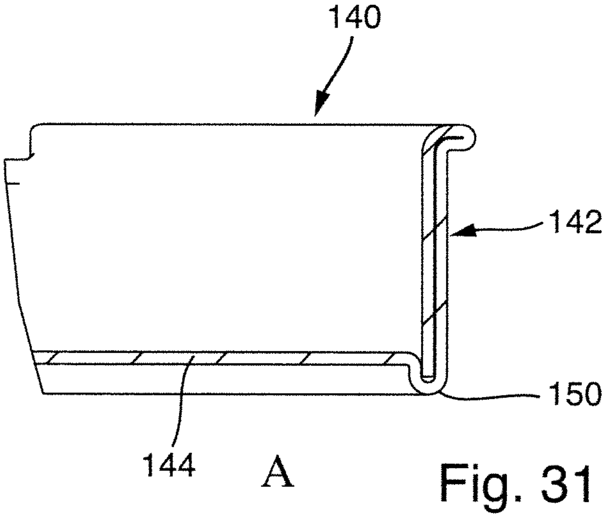
FIG. 31 shows the detail A from FIG. 30.

The radially outward extending protrusions 146, 148 are disposed so as to be mutually opposite and extend in each case only across an angular range of approximately 130° about the circumference of the lid 140, see FIG. 29. Two mutually opposite and radially inward extending protrusions 156, 158 are disposed between the two radially outward extending protrusions 146, 148. The protrusions 156, 158 form in each case an extraction aid for a user. A user can grip below one of the protrusions 156, 158 with one or a plurality of fingers and, as a result, lift the lid 140 from a container.

Figure 28:
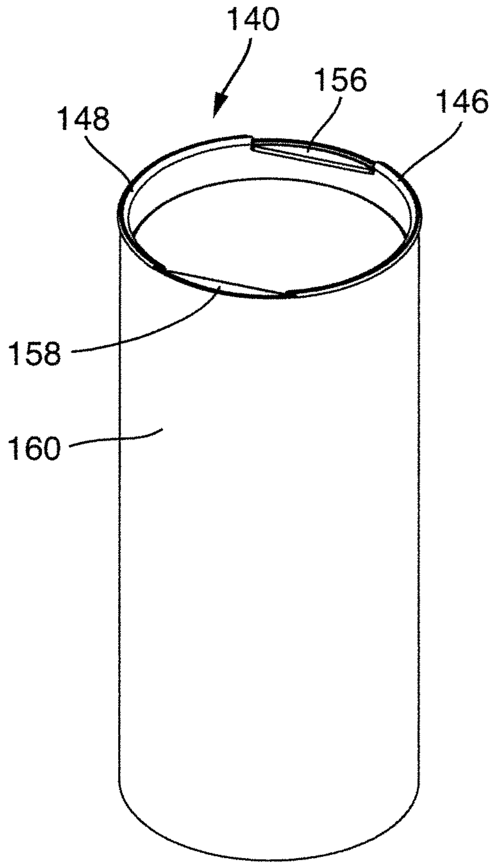
FIG. 28 shows the lid of FIG. 27 in the state placed on a container.

FIG. 28 shows the lid 140 in a state in which the latter closes a container 160. The container 160 is configured as a cylindrical sleeve. It can be seen that the lid 140 is depressed into the container 160 up the radially outward extending protrusions 146, 148. The lower sides of the protrusions 146, 148 in this instance form a detent such that the lid 140 cannot be pressed farther into the container 160. As a result, an external face of the lid collar 142 in portions bears on the internal face of a shell of the container 160.

As has already been discussed, the lid 140 can be extracted from the container 160 in that one reaches below one of the two protrusions 156, 158 and the lid 140 in FIG. 28 is extracted upward from the container 160.

Figure 32:
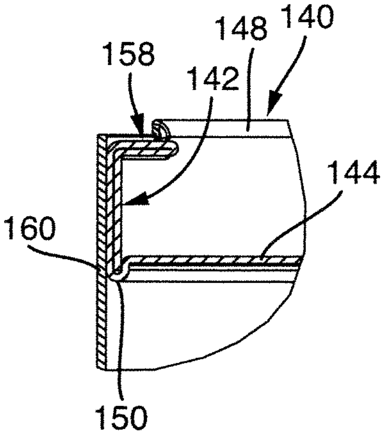
FIG. 32 shows portions of a sectional view of the container with the lid from FIG. 28.

FIG. 32 shows portions of a sectional view of the assembly of FIG. 28. The container 160 can be seen in the region of the upper open end thereof. The section plane in FIG. 32 runs through the radially inward extending protrusion 158. Portions of the radially outward extending protrusion 148 can likewise be seen.

The radially inward extending protrusion 158 is configured in that the outer ply of the lid collar 142 is bent radially inward by 90° and after a horizontal profile of a few millimeters, for example 5 mm is folded over in a radially outward manner by 180° again. The protrusion 158 is configured in a two-ply manner as a result. The inner ply of the lid collar 142 is then disposed so as to be parallel to the outer ply again, and the periphery of the inner ply is received in the groove which is disposed on the outer periphery of the lid plate 144.

Figure 33:
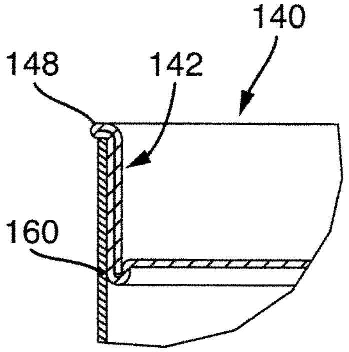
FIG. 33 shows portions of a further sectional view of the container with the lid from FIG. 28.

FIG. 33 shows a section through the assembly of FIG. 28, wherein the section plane runs through the radially outward extending protrusion 148. It can be seen that the external face of the lid collar 142 bears in a planar manner on the internal face of the external wall of the container 160. It can also be seen that the lid 140 is depressed into the container 160 so far that the lower side of the radially outward extending protrusion 148 lies against the upper periphery of the external shell of the container 160.

Figure 34:
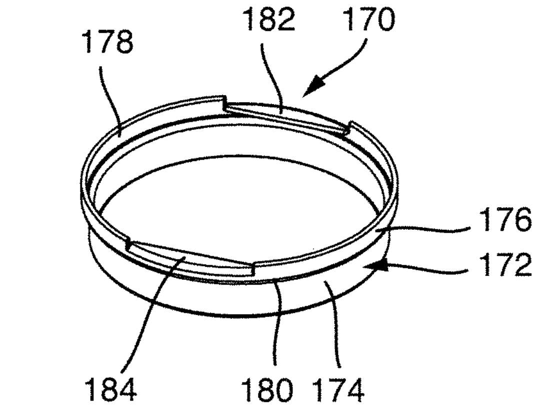
FIG. 34 shows a view of a lid according to the invention and according to a tenth embodiment from obliquely above.

FIG. 34 shows a lid 170 according to a further embodiment of the invention. The lid 170 is configured as a snap-in lid and produced from an integral, planar blank. The lid 170 in terms of construction is very similar to the lid 140 which has already been described by means of FIGS. 27 to 33. Therefore, only the points of differentiation in comparison to the lid 140 will be explained hereunder.

Figure 35:
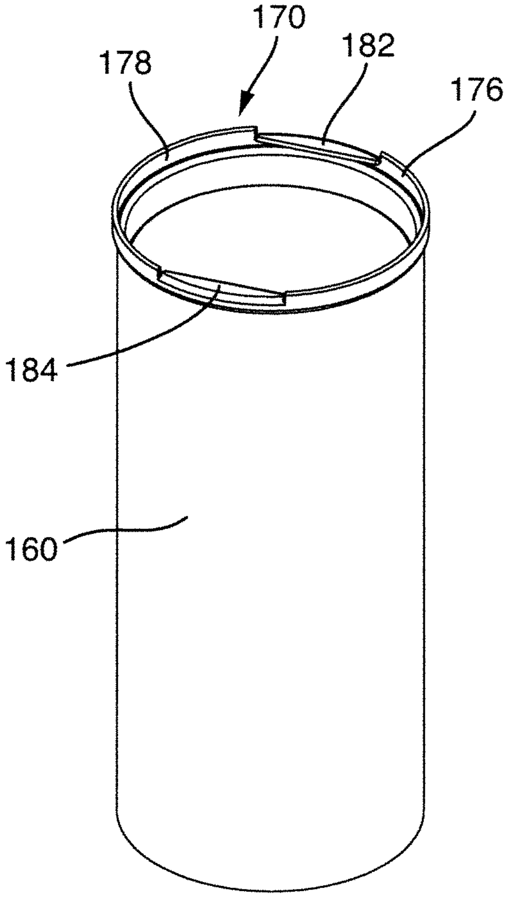
FIG. 35 shows the lid of FIG. 34 in the state placed on a container.

FIG. 35 shows an assembly with a container 160 which is configured as a cylindrical sleeve having a circular cross section. The lid 170 is depressed into the upper open end of the container 160.

The lid 170 has a lid collar 172, wherein the lid collar 172 has a lower portion 174, the external circumference of the latter being smaller than the internal circumference of the container 160 or being exactly the same size as the internal circumference of the container 160. The lid collar 172 has an upper portion which has been deformed in a radially outward manner and, as a result, has two mutually opposite protrusions 176, 178. At the transition from the lower portion 174 of the lid collar 172 to the upper portion, which is widened in a radially outward manner, the lower side of the protrusion 176 forms a shoulder, or a detent, respectively, wherein this shoulder delimits the depression depth of the lid 170 into the container 160. This radially outward extending shoulder 180 encircles the entire circumference of the lid collar 172.

Two radially inward extending protrusions 182, 184 are disposed so as to be mutually opposite between the radially outward extending protrusions 176, 178. The radially inward extending protrusions 182, 184 serve as an extraction aid. A user can grip below one or both of the protrusions 182, 184, see FIG. 35, and as a result extract the lid 170 upward from the container 160.

Figure 36:
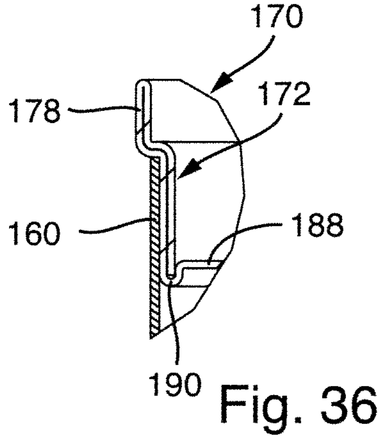
FIG. 36 in portions shows a sectional view of the lid with the container from FIG. 35.

FIG. 36 shows portions of a sectional view of the assembly of FIG. 35, wherein a section plane runs through the radially outward extending protrusion 178. It can be seen that the shoulder, which is located at the transition between the lower portion of the lid collar 172 and the upper portion of the lid collar 172 and extends radially outward, forms a detent up to which the lid 170 can be depressed into the open end of the container 160.

Figure 37:
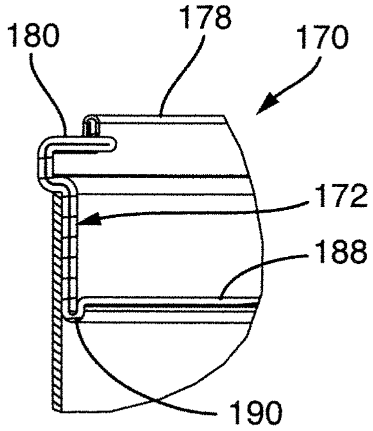
FIG. 37 in portions shows a further sectional view of the lid with the container from FIG. 35.

FIG. 37 shows portions of a sectional view of the assembly of FIG. 35, wherein the section plane runs through the radially inward extending protrusion 180. Portions of the radially outward extending protrusion 178 can likewise be seen.

As has been explained, the shoulder between the lower portion of the lid collar 172 and the upper portion of the lid collar 172, which has been deformed in a radially outward manner, encircles the entire circumference of the lid 170. As a result, the lid 170 sits reliably on the container 160 and as a result can also reliably seal the latter.

It can be seen in FIG. 36 as well as FIG. 37 that a lid plate 188 on the outer periphery thereof has a groove 190 in which the peripheral end portion of the inner ply of the lid collar 172 is received and, as a result, mechanically latched As a result, the lid 170, like the lids 100, 120, 140 already described, can be configured from non-coated paper material.

In the production of the lids 10, 50, 60, 40, 80, 90, 100, 120, 140, 170 according to the invention, an integral, planar circular blank is initially deformed to a pot-type intermediate element. In the production of a circular lid as is illustrated in FIGS. 1 to 37, the planar blank is circular. In the production of a lid with a different shape, for example rectangular or oval, the planar blank of course has a different shape. After the pot-type intermediate element is configured, the encircling wall assembly of the pot-type element is folded, or folded over, such that a first ply of the lid collar, which in the radial direction is on the outside, and a second ply of the lid collar, which in the radial direction is on the inside, are formed. The wall assembly of the pot-type element here can be folded over by 180°, but in the context of the invention does not necessarily have to be folded over by 180°. Angles of less than 180° are possible.

Before or after the encircling wall assembly of the pot-type element has been folded over, or else even before the pot-type element is configured, a groove is formed in a radially outer region of the base of the pot-type intermediate element. This can be performed by embossing an encircling groove in the still flat, planar blank, for example. A peripheral end portion of the second ply of the lid collar is then latched into this groove once the encircling wall assembly of the pot-type element has been folded over. As a result the second ply is fixed in the position thereof, even without the utilization of an adhesive.

The groove can be molded in such a way that a portion of the first ply of the lid collar forms a lateral wall of the groove. As a result, the groove is disposed directly on the periphery of the lid plate.

In the context of the invention, the groove may also be configured somewhat within the outer periphery of the lid plate. In this instance, the second ply of the lid collar is not folded over by 180° but by a smaller angle. The groove does also not necessarily have to be embossed or molded from the lower side of the lid plate. For example, the groove can also be formed between a protrusion that protrudes beyond the lower side of the lid plate 12 and the inside of the first ply of the lid collar.

In the method according to the invention, the groove can be shaped in such a way that an encircling protrusion is configured on an upper side of the lid plate that lies opposite the lid collar, wherein the groove is disposed on a side of the protrusion that faces the lower side of the lid plate. This protrusion can form the outer periphery of the lid plate and, as a result, simultaneously contributes toward reinforcing the lid plate.

The peripheral end portion of the second ply, at least in portions, can be fixed in the groove by means of an adhesive. To this end, an adhesive bead from hot-melt adhesive can be incorporated in the groove before the peripheral end portion of the second ply latches in the latter, for example.

In the production of the lid according to the invention, the lid plate can be shaped by means of embossing the base of the pot-type intermediate element. In the process, embossings or stampings can be performed for reinforcing the lid plate, for example, or also for attaching a drinking opening, for example, or only attaching a perforation in the region of which a drinking opening can then be placed by a user. On the lid collar, protrusions which extend radially outward or which extend radially inward can be formed.

The invention claimed is:

1. A lid from paper, paperboard or paper-like material for a container, wherein the lid is formed from a one-piece integral planar blank and has a lid plate and a lid collar, the lid collar projecting from a periphery of the lid plate, the lid collar being formed from at least two plies of the one-piece integral planar blank, a first ply of the lid collar, starting from the periphery of the lid plate, extending to a peripheral edge portion of the lid collar, a second ply of the lid collar being disposed on an inner side of the lid collar, the second ply starting from the peripheral edge portion of the lid collar and extending towards the lid plate and terminating at a second ply peripheral end portion, the second ply peripheral end portion having at least a portion latched in a groove by a latching action, the groove being disposed in a region of the periphery of the lid plate and being defined solely by the one-piece integral planar blank, the at least a portion of the second ply peripheral end portion being fixed in the groove solely by the latching action, and further wherein:

the second ply peripheral end portion is configured with clearances or is configured so as to be wave-shaped; and/or the second ply has incisions, the incisions starting from the second ply peripheral end portion, and portions of the second ply disposed between the incisions are configured so as to extend obliquely radially inwardly.

* * * * *